United States Patent
Benavides

(10) Patent No.: US 9,732,603 B2
(45) Date of Patent: Aug. 15, 2017

(54) FLUID INJECTION FILTRATION SYSTEM

(71) Applicant: Eric Benavides, Fairview, TX (US)

(72) Inventor: Eric Benavides, Fairview, TX (US)

( * ) Notice: Subject to any disclaimer, the term of this patent is extended or adjusted under 35 U.S.C. 154(b) by 272 days.

(21) Appl. No.: 14/318,194

(22) Filed: Jun. 27, 2014

(65) Prior Publication Data

US 2015/0041416 A1 Feb. 12, 2015

Related U.S. Application Data

(63) Continuation of application No. 13/961,876, filed on Aug. 7, 2013, now abandoned.

(51) Int. Cl.
| | | |
|---|---|---|
| *B01D 63/00* | (2006.01) | |
| *E21B 43/34* | (2006.01) | |
| *B01D 35/28* | (2006.01) | |
| *B65G 5/00* | (2006.01) | |
| *C02F 1/00* | (2006.01) | |
| *E21B 43/40* | (2006.01) | |
| *E21B 41/00* | (2006.01) | |

(Continued)

(52) U.S. Cl.
CPC .............. *E21B 43/34* (2013.01); *B01D 35/28* (2013.01); *B65G 5/00* (2013.01); *C02F 1/00* (2013.01); *C02F 1/004* (2013.01); *C02F 1/008* (2013.01); *E21B 41/0057* (2013.01); *E21B 43/40* (2013.01); *C02F 2101/32* (2013.01); *C02F 2103/10* (2013.01); *C02F 2103/365* (2013.01); *C02F 2209/006* (2013.01); *C02F 2209/008* (2013.01); *C02F 2209/03* (2013.01); *C02F 2301/08* (2013.01); *C02F 2303/14* (2013.01); *C02F 2303/16* (2013.01); *C02F 2303/24* (2013.01)

(58) Field of Classification Search
None
See application file for complete search history.

(56) References Cited

U.S. PATENT DOCUMENTS 3,650,283 A 3/1972 Lang
3,831,761 A 8/1974 Chantereau
(Continued)

FOREIGN PATENT DOCUMENTS

WO 2012026827 A1 3/2012

OTHER PUBLICATIONS

Benavides, Eric, Patent Application entitled "Fluid Injection Filtration System," filed Aug. 7, 2013, U.S. Appl. No. 13/961,876.
(Continued)

*Primary Examiner* — Richard Gurtowski

(57) ABSTRACT

A system for filtering produced fluid from a wellbore comprises a filter system, a solids collection vessel in fluid communication with a drain in the filter system, and a fluid line coupled to the solids collection vessel. The filter system comprises a housing defining a chamber, a filtration device disposed within the chamber, a fluid inlet disposed in the housing and configured to receive a fluid comprising suspended solids into an inlet portion, a fluid outlet disposed in the housing and configured to pass the fluid out of the housing from an outlet portion, and a drain in fluid communication with a lower portion of the housing and configured to pass at least a portion of the suspended solids out of the inlet portion of the housing.

13 Claims, 7 Drawing Sheets

(51) Int. Cl.
  *C02F 101/32* (2006.01)
  *C02F 103/10* (2006.01)
  *C02F 103/36* (2006.01)

(56) References Cited

U.S. PATENT DOCUMENTS

| | | | |
|---|---|---|---|
| 3,880,237 A | 4/1975 | Snavely, Jr. et al. | |
| 3,939,659 A | 2/1976 | Matthews | |
| 3,998,735 A | 12/1976 | Nathan | |
| 4,039,452 A * | 8/1977 | Fernandez | B01D 29/05 |
| | | | 210/106 |
| 4,349,434 A | 9/1982 | Jaworski | |
| 4,482,459 A | 11/1984 | Shiver | |
| 4,515,607 A | 5/1985 | Wolde-Michael | |
| 4,689,153 A | 8/1987 | Follmann et al. | |
| 4,793,938 A | 12/1988 | Dayton | |
| 5,032,293 A * | 7/1991 | Tuite | B01D 29/23 |
| | | | 210/241 |
| 5,047,123 A * | 9/1991 | Arvanitakis | B01D 3/08 |
| | | | 159/25.1 |
| 5,252,224 A | 10/1993 | Modell et al. | |
| 5,597,042 A | 1/1997 | Tubel et al. | |
| 5,626,751 A | 5/1997 | Kikuchi et al. | |
| 5,783,245 A | 7/1998 | Simpson, II | |
| 6,123,174 A | 9/2000 | Elkin et al. | |
| 6,257,332 B1 | 7/2001 | Vidrine et al. | |
| 7,510,656 B2 | 3/2009 | Shafer et al. | |
| 8,158,010 B2 | 4/2012 | Pearse et al. | |
| 8,323,506 B2 | 12/2012 | Gannon | |
| 2005/0139530 A1 | 6/2005 | Heiss | |
| 2007/0023193 A1 | 2/2007 | King | |
| 2007/0090039 A1 | 4/2007 | Young et al. | |
| 2010/0218946 A1 | 9/2010 | Symington et al. | |
| 2013/0087502 A1 | 4/2013 | Blumer et al. | |

OTHER PUBLICATIONS

Benavides, Eric, Patent Application entitled "Fluid Injection Filtration System," filed Jun. 27, 2014, U.S. Appl. No. 14/318,205.

Benavides, Eric, Patent Application entitled "Fluid Injection Filtration System," filed Aug. 7, 2014, PCT Application No. PCT/US14/50078.

Office Action—Restriction Requirement—dated Oct. 22, 2013, U.S. Appl. No. 13/961,876, filed Aug. 7, 2014.

Office Action dated Feb. 12, 2014, U.S. Appl. No. 13/961,876, filed Aug. 7, 2014.

Final Office Action dated Jul. 18, 2014, U.S. Appl. No. 13/961,876, filed Aug. 7, 2014.

Advisory Action dated Jul. 18, 2014, U.S. Appl. No. 13/961,876, filed Aug. 7, 2014.

Foreign Communication from a Related Counterpart—International Search Report and Written Opinion, dated Dec. 2, 2013, PCT/US14/50078, filed on Aug. 7, 2014.

\* cited by examiner

FLUID INJECTION FILTRATION SYSTEM

CROSS-REFERENCE TO RELATED APPLICATIONS

This application is a continuation of and claims priority under 35 U.S.C. §120 to U.S. patent application Ser. No. 13/961,876, filed Aug. 7, 2013, entitled "Fluid Injection Filtration System", which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the production of hydrocarbons, water is often produced along with the hydrocarbons. The water may result from various sources including naturally occurring water within a subterranean formation and/or water recovered after it is injected into the formation as part of a treatment procedure (e.g., formation stimulation, water or steam flooding, etc.). The water recovered from the subterranean formation may be reinjected into the same or a different subterranean formation in order to dispose of the water in a safe and efficient manner. Often, dedicated injection wellbores may be used for injecting the recovered water, though repurposed or converted wells may also be used for injection purposes.

The water that is to be injected into an injection well often contains impurities. For example, the water may contain salts, various chemicals present in the oilfield industry, suspended solids, and the like. The presence of the solids can detrimentally affect the injection well by plugging the pores in the injection formation, thereby damaging the injection wellbore and limiting the ability to inject fluids in the future.

SUMMARY

In an embodiment, a method of injecting fluid into an injection well, the method comprises receiving, by an input device, an input, verifying an authorization to use a filter assembly in response to receiving the input, opening an actuator valve in response to the verifying, actuating a pump in fluid communication with the actuator valve in response to the verifying, receiving a fluid within a filter assembly, and separating at least a portion of any suspended solids in the fluid within the filter assembly. The pump is in fluid communication with the filter assembly, and the fluid comprises suspended solids.

In an embodiment, a fluid injection system comprises a filter assembly configured to receive a fluid comprising suspended solids and separate at least a portion of the suspended solids from the fluid, an actuator valve coupled to an outlet of the filter assembly, a pump coupled to the outlet of the filter assembly, an input device, a controller comprising a memory and a processor, and a control program stored in the memory. The actuator valve is configured to selectively control fluid flow out of the filter assembly, and the pump is configured to draw fluid into the filter assembly. The control program, when executed on the processor, configures the processor to: receive an input from the input device, verify an authorization of a user to use the system based on the input, authenticate the user based on the verification, open the actuator valve to allow fluid flow through the filter assembly based on the authentication, and actuate the pump to draw fluid into the filter assembly based on the authentication.

In an embodiment, a filter system for filtering produced water from a wellbore comprises a housing defining a chamber, a filtration device disposed within the chamber, a fluid inlet disposed in the housing and configured to receive a fluid comprising suspended solids into the inlet portion, a fluid outlet disposed in the housing and configured to pass the fluid out of the housing from the outlet portion, and a drain disposed in a lower portion of the housing and configured to pass a portion of the fluid comprising at least a portion of the suspended solids out of the inlet portion of the housing. The filtration device divides the chamber into an inlet portion and an outlet portion, and the filtration device comprises a metallic screen material.

In an embodiment, a method of providing a portable filtration device comprises transporting a portable filtration device to a first location on a transportation device, passing a fluid comprising suspended solids through the into through the fluid inlet, passing the fluid through the filtration device within the housing, separating at least a portion of the suspended solids from the fluid using the filtration device to produce a filtered fluid, passing the filtered fluid out of the housing through the fluid outlet, passing at least a portion of the separated suspended solids through the drain, and receiving the portion of the separated suspended solids within the solids collection vessel. The portable filtration device comprises a housing, a filtration device disposed within the housing, a fluid inlet, a fluid outlet, a drain, and a solids collection vessel in fluid communication with the drain.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
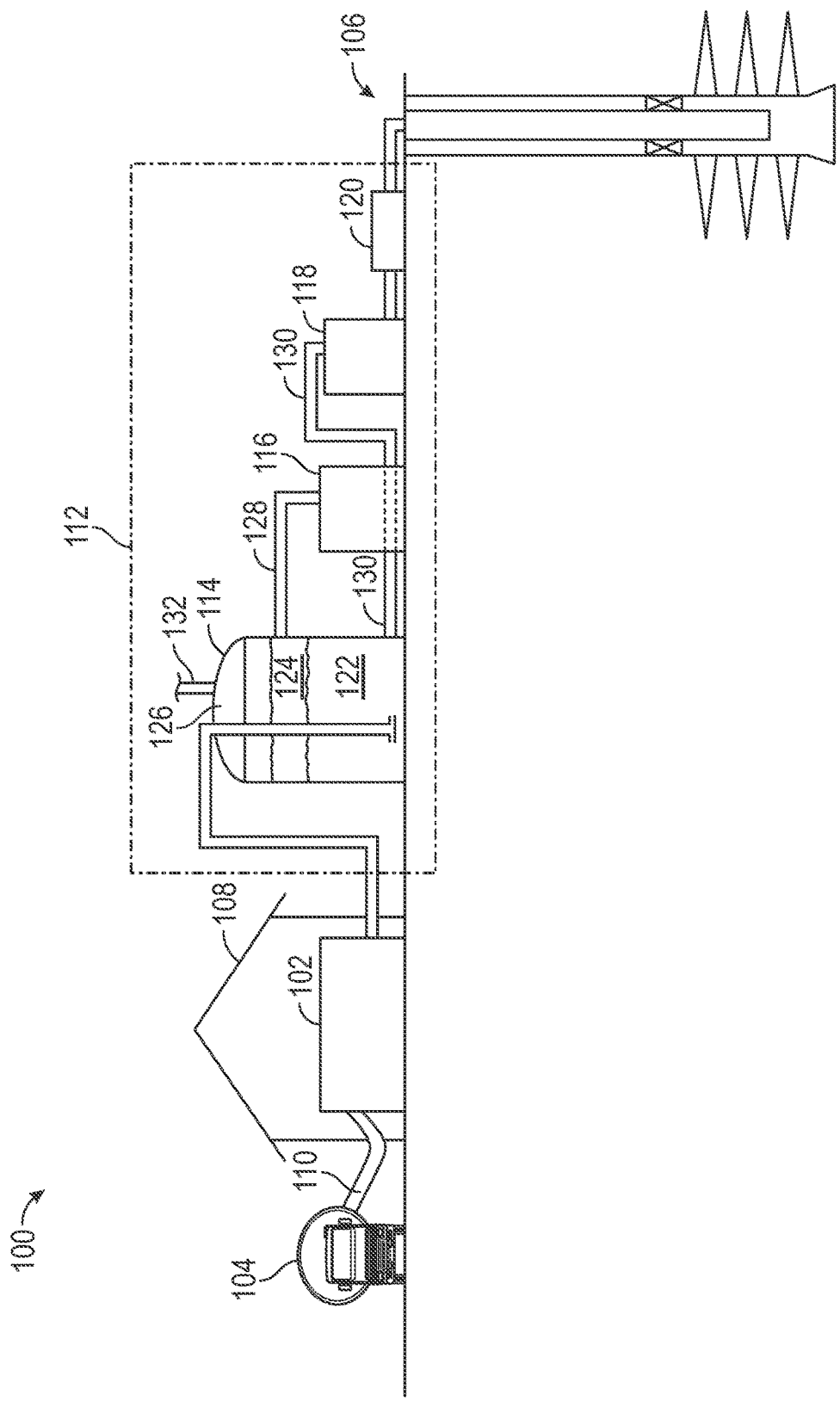
FIG. 1 illustrates a schematic representation of a fluid injection system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed infra may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ".

The fluids (e.g., aqueous fluids) produced during the production of hydrocarbons can comprise various impurities such as solids. Solids, often suspended in the fluid, can result from a number of sources including formation fines (e.g., clays, sand, silt, etc.) coming from the formation itself, precipitates, scales, organic solids, gels, and various solids resulting from injected chemicals and treatment equipment. When the solids are injected into a well, the solids can travel into the pores of the formation, potentially clogging and inhibiting further fluid flow into the formation. The degree to which the solids can plug the formation varies. When the porosity of a formation is affected by solids, a treatment procedure such as an acid injection can be used to attempt to remove or dissolve a portion of the solids. The composition of the solids can affect the amount to which a workover or treatment procedure can remediate any damage. While some remediation procedures are available, they are costly in terms of time and money to perform.

In order to avoid or limit the injection of the solids into the formation, a fluid injection system may comprise a filter apparatus configured to remove a portion of the solids. Various types of filters can be used such as removable and disposable filters. These filters are typically placed into service with a relatively short expected operating life. When the filters are filled, they can be removed and disposed of with the filtered solids inside. The use of the disposable filters can present several problems. For example, the disposable nature of the filters tends to drive their design towards inexpensive materials. These filters may be prone to failure if the operating pressure is exceeded. For example, a user may increase a pump pressure above the operating threshold of the filter, causing the filter to fail. When a filter fails, the trapped solids may be released for injection into the injection well. Moreover, the frequent replacement of the filters increases the chances that a filter is installed improperly, potentially leading to fluid bypassing the filter. Finally, the replaceable nature of the filter provides the opportunity for the filter to be bypassed by removing the filter and not reinstalling a new filter.

A system and method are provided herein for reducing the ability of a user to bypass the filter assembly in a fluid injection system. The fluid injection system generally comprises a filter assembly, an actuator valve, a pump, and a control system. The control system accepts an input from a user and only actuates the actuator valve and pump when the user is authorized to use the system. By controlling the actuator valve and pump, the control system can ensure that an unauthorized user cannot pump through the system into the injection well. Moreover, the use of a pump associated with the facility rather than the vehicle delivering the fluid may allow the control system to control the pressure within the filter assembly, thereby reducing or eliminating the occurrence of pressure induced failure of the filters. Additional sensors can be used to ensure that the filter is properly installed prior to actuating the system, thereby reducing or eliminating the occurrence of a user bypassing a filter. The use of the control system also allows the system to operate without an employee on site, which is to say that the control system may enable the facility to operate as an unmanned facility while maintaining the appropriate supervision of the fluid injection system. Overall, the fluid injection system may provide increased solids separation for fluids passing to an injection well.

As further described herein, the system may be provided as a stationary location or a portable facility for use in filtering fluids for injection into an injection well. In some instances, the system may be constructed at or near an injection well and serve as a permanent, built-in facility. Alternatively, the system may be constructed as a portable unit such as a skid mounted unit. The system may be constructed in one location and transported to a new or existing injection well. The system may then be connected to the injection well, a storage area, and/or an existing filtering facility. The ability to provide the system as a skid mounted unit may allow existing facilities to be upgraded with relatively minor modifications and downtime.

Also described herein is a filter assembly for use with the fluid injection system. The filter assembly comprises a housing defining a chamber, a filtration device disposed in the chamber and dividing the chamber into an inlet portion and an outlet portion, a fluid inlet that receives a fluid into the inlet portion of the chamber, a fluid outlet that receives the fluid after is passes through the filtration device and passes the fluid out of the housing, and a drain that allows any separated solids to be removed from the inlet portion of the chamber. The filtration device is configured to separate at least a portion of the solids from a fluid passing through the filtration device. The portion of the solids that are separated can be retained in the inlet portion of the housing, and the drain can then be used to remove the separated solids from the housing. The filter assembly can be used as the filter assembly within the filtration system described herein, and/or the filter assembly can be used as a portable device. When used as a portable device, the filter assembly may serve to filter produced water at a well site during a variety of wellbore drilling, installation, production, and servicing operations. For example, the filter assembly can be transported to a well site and used to pre-filter any produced water prior to the water being taken to an injection well for disposal.

In general, the filtration device can be reusable and can be cleaned within the filter assembly. The reusable nature of the filtration device can allow the filtration device to be constructed of stronger materials than the disposable filters. This construction may allow the filter assembly to be more robust than a filter having disposable filter elements and may provide a cost savings in avoiding constant replacement of the filter element. Further, the ability to clean the filtration device within the filter assembly limits the opportunities for the filtration device to be incorrectly installed or removed, which also reduces the chances that the filtration device could become damaged during installation. Thus, the filter assembly design provided herein may be more reliable than a filter system having disposable filters. When used with the fluid injection system described herein, the resulting system may provide a reliable and controlled fluid injection system that improves the filtering process for a fluid being sent to an injection well.

FIG. 1 schematically illustrates an embodiment of a fluid injection system 100. The system 100 generally comprises a filter assembly 102 that receives a fluid to be injected. The fluid may be received from various sources such as a pipeline and/or a vessel 104. The vessel 104 may be part of a truck (e.g., a vacuum truck) or other vehicle used to transport fluid for disposal to the injection well 106. In some embodiments, the filter assembly 102 may be located within a building or roofed structure 108. The fluid may pass from the filter assembly 102 to a storage section 112 comprising one or more separators 114 and storage tanks 116, 118, which may serve to store any separated hydrocarbons and the filtered water for injection. A high pressure pump 120 may serve to inject the filtered and accumulated water within the storage tanks 118 into the injection well 106.

The fluid injection system 100 may generally be used to receive and filter a fluid prior to injection into the injection well 106. In general, the fluid to be injected may be delivered to the injection site in a vessel 104 associated with a truck or other transportation device. In some embodiments, a pipeline may deliver the fluid and be coupled directly to one or more fluid injection system 100 inlets. When the fluid is delivered in a vessel 104, the vessel 104 may be connected to the filter assembly 102 using various fluid conduits 110 (e.g., hoses). These conduits 110 can be supplied with the vehicle, but as described in more detail herein, the conduits 110 may be supplied by the operator of the facility to ensure they are properly maintained.

Once connected to the filter assembly 102, the fluid may be transferred from the vessel 104 to the injection well 106 through the filter assembly 102. In some embodiments, a pump associated with the vessel 104 and/or vehicle may be used to transfer the fluid from the vessel 104 through the filter assembly 102. For example, a pump may be located on the vehicle and be connected to the vessel 104. The conduits 110 may then be connected to the outlet of the pump so that when the pump is turned on, the pump transfers fluid from the vessel 104 to the filter assembly 102. In other embodiments, a pump may be associated with the system 100. For example, a pump may be coupled into the system downstream of the filter assembly 102 (e.g., between the filter assembly 102 and the injection well 106) and used to draw fluid into the filter assembly 102 from the vessel 104. In an embodiment, a pump may not be needed when the fluid is supplied through a pipeline. In this embodiment, the fluid pressure may be supplied by one or more upstream components associated with the pipeline.

As the fluid flows through the filter assembly 102, at least a portion of any suspended solids within the fluid may be separated. The filtered fluid may pass through the filter assembly 102 for downstream injection in the injection well 106. The filtered solids may then be removed from the filter assembly 102 for disposal. As described in more detail below, various types of filters and filtration devices may be used to separate the portion of the suspended solids from the fluid as the fluid passes through the filter assembly 102.

After passing through the filter assembly 102, the fluid may pass to a storage section 112. In general, the fluid passing through the filter assembly 102 may comprise hydrocarbons such as produced oil. A separator 114 such as a settling tank (e.g., a gunbarrel settling tank, etc.), heater treater, free water knockout, vortex tube separator, and the like may receive the fluid from the filter assembly 102 and separate the fluid into two or more phases when hydrocarbons are present in the water. The fluid may be separated into a water phase 122, a hydrocarbon phase 124, and a gas phase 126. The hydrocarbon phase 124 may exit through line 128 and pass to a hydrocarbon storage tank 116. While only one hydrocarbon storage tank 116 is illustrated in FIG. 1, a plurality of hydrocarbon storage tanks 116 may be present to meet the storage requirements of the separated hydrocarbon phase 124. The hydrocarbon storage tanks 116 may be periodically transferred for sale or other use to a pipeline or transport vehicle. The gas phase 126 may comprise one or more inert gases (e.g., air entrained in the filtration system) and/or gases evolved from the hydrocarbon phase 124. The gas phase 126 can be vented through line 132 to the atmosphere, vented to a flare, and/or gas balanced to the storage tanks 116. The separated water phase 122 may be passed downstream for injection into the injection well 106. Initially, the separated water phase 122 may exit the separator 114 through line 130 and pass to an injection water storage tank 118. The injection water storage tank 118 may retain and accumulate the filtered water until a predetermined level is reached. At this time, a high pressure pump 120 may be activated to pressure the filtered water and inject it into the injection well 106. When the water level within the injection water storage tank 118 drops below a predetermined level, the pump 120 may shut off and allow the filtered water to accumulate in the injection water storage tank 118. While only one injection water storage tank 118 is illustrated in FIG. 1, any number of injection water storage tanks 118 may be present to meet the storage requirements of the separated water phase 122. Thus, the storage section 112 may serve to receive the filtered fluid, separate the fluid into one or more components, and inject the water into the injection well 106.

Various facilities operating as fluid injection systems 100 may be either manned or unmanned. Manned facilities have one or more personnel at the site that are associated with the fluid injection system 100. The personnel may inspect the fluid arriving in the vessels 104 on the vehicles and assist with connecting the vessels 104 to the filter system 102 using fluid conduits 110 (e.g., hoses) that are usually supplied by the vehicle. The personnel may be responsible for ensuring that the system 100 operates as intended and can correct various issues that may arise. An unmanned facility may rely on a driver or other user associated with the vehicle to operate the fluid injection system 100 while not having any personnel associated with the system 100 present. If any problems arise during the use of the system 100, the user may be responsible for correcting any issues on their own. In general, a user may not be trained, may not be capable of, or may purposely choose to circumvent one or more features of the system 100. For example, when the filter system comprises a filter sock, a user may choose to remove the filter sock within the filter assembly and/or use a pump pressure so high that the filter sock fails, thereby passing suspended solids through the filter assembly and into the injection well 106. When implemented at a manned facility, the fluid injection system described herein may allow a manned facility to be converted into an unmanned facility. For example, the additional level of control and oversight provided by the fluid injection systems and filter assemblies described herein may allow for operation of the facility without any personnel associated with an injection well location being present.

Figure 2:
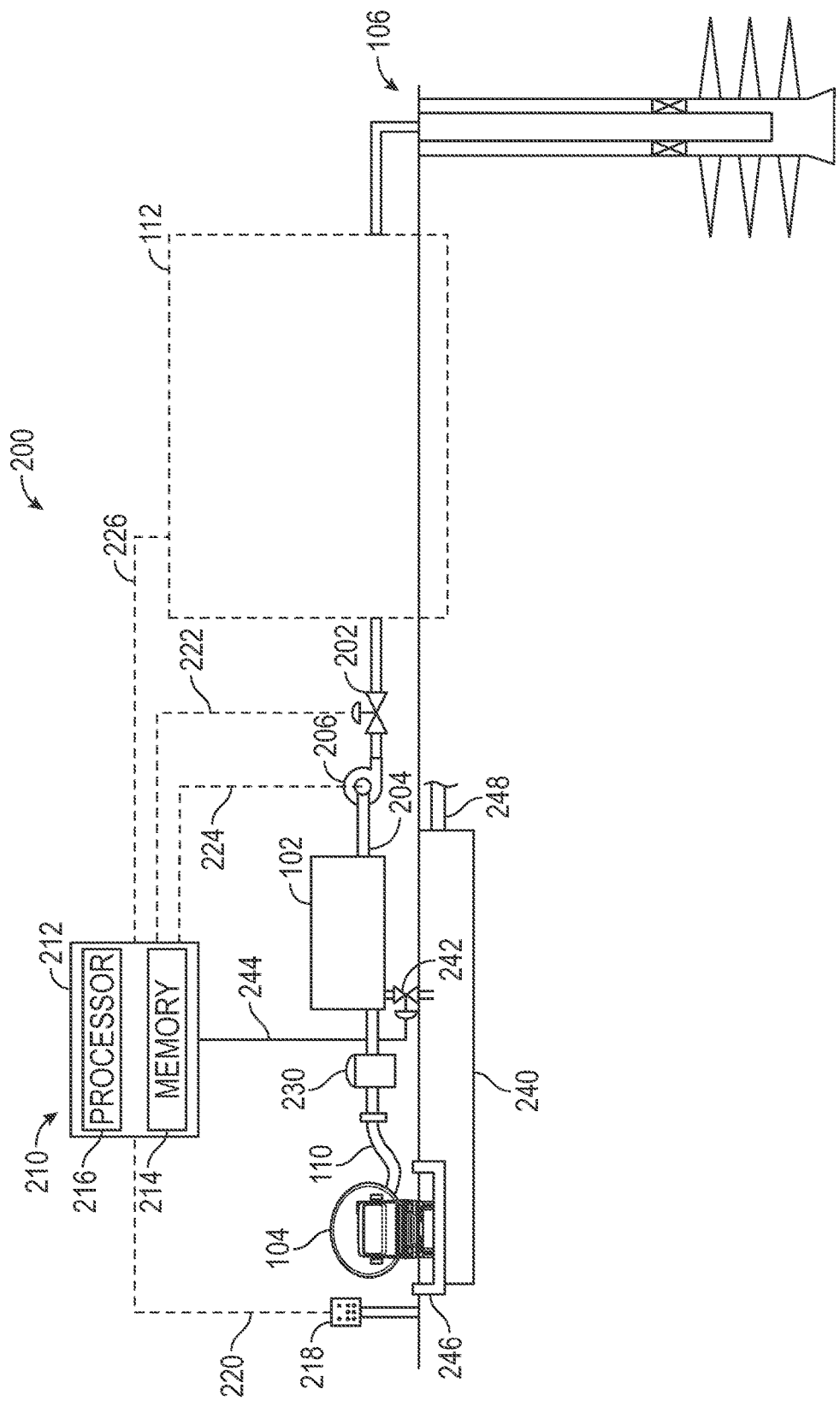
FIG. 2 illustrates a schematic representation of another fluid injection system according to an embodiment.

FIG. 2 illustrates a fluid injection system 200 similar to the system 100 described above. In some embodiments, the system 200 may comprise a filter system designed to prevent the circumvention of the filter system. The system 200 generally comprises a filter assembly 102 configured to receive a fluid comprising suspended solids from a fluid source, such as the vessel 104. An actuator valve 202 may be in fluid communication with the filter assembly 102. As shown in FIG. 2, the actuator valve 202 can be disposed in a fluid line 204 downstream from the filter assembly 102 and/or the actuator valve 202 can be disposed in a fluid line upstream of the filter assembly 102. A pump 206 may also be disposed in the fluid line 204 either upstream or downstream from the actuator valve 202. The fluid passing through the fluid injection system 200 may pass to a storage section 112 that may be substantially the same as or similar to the storage section 112 described with respect to FIG. 1.

As shown in FIG. 2, the filter assembly 102 may generally comprise any device configured to remove at least a portion of any suspended solids in a fluid. As described in more detail below, the filter assembly 102 may comprise a filtration device formed from a screen. The screen may extend across the interior of the filter assembly housing or be formed in the shape of a cylinder within the housing. In some embodiments, the filter assembly 102 may comprise replaceable and/or disposable filtration devices such as filter tubes or filter socks. While replaceable filtration devices may provide suitable filtering and separation capabilities, they can fail if not properly installed and typically require an additional expense for disposal upon being replaced. In some instances, the solids separated and retained in the replaceable filtration devices may contain naturally occurring radioactive materials (NORM) that make the replaceable filtration devices unsuitable for handling, further complicating their removal and disposal. The design of an embodiment of the filter assembly is described in more detail herein with respect to FIGS. 3 and 4.

The actuator valve 202 is configured to selectively control fluid flow through the filter assembly 102. The actuator valve 202 comprises an inlet, an outlet, and a control means for providing selective fluid communication between the inlet and outlet. In some embodiments, the actuator valve 202 may be manually operated. Various types of actuator valves may be used. For example, the actuator valve 202 may include, but is not limited to, a gate valve, a ball valve, a plug valve, a globe valve, a butterfly valve or the like. When used with the control system 212, the actuator valve 202 may be automatically controlled to actuate to an open position, a closed position, or any position in between an open and closed position in response to an input signal from the controller 212. Various types of valve controls are generally known and are suitable for use with the actuator valve 202 describe herein. For example, the actuator valve 202 may be controlled by a pneumatic controller, a hydraulic controller, an electro-mechanical controller (e.g., a solenoid, motor, etc.), and the like. The actuator valve 202 may be sized to accommodate an expected or desired flow rate through the system 200 for injection into the injection well 106. While illustrated in FIG. 2 as being disposed downstream of the filter assembly 102 and therefore controlling fluid flow out of the filter assembly 102, the actuator valve 202 can also be disposed in a fluid line upstream of the filter assembly 102 and thereby controlling fluid flow into the filter assembly 102.

The pump 206 is configured to draw fluid from the vessel 104 into the filter assembly 102. The pump 206 can comprise any suitable type of pump known for receiving a fluid, increasing the pressure, and output the fluid to a downstream source. For example, the pump 206 may comprise a centrifugal pump, a positive displacement pump, or any other suitable pump. Due to the discontinuous nature of the fluid flow from vessels transported by vehicles, the pump 206 may be configured to handle both liquids and gases to some degree, though in some embodiments, sensors may be used to ensure that the pump maintains a sufficient fluid head to prime the pump for each use. In an embodiment, the pump 206 is disposed downstream of the filter assembly 102 between the filter assembly 102 and the injection well 106. The pump 206 may be disposed either upstream or downstream of the actuator valve 202. By locating the pump 206 downstream of the filter assembly 102, the fluid may be pulled into the filter assembly 102, thereby limiting the pressure within the filter assembly 102 and potentially preventing or limiting an overpressure condition within the filter assembly 102. The pump 206 is configured to draw fluid into the filter assembly 102 and pass the fluid to the storage section 112 and can be sized (e.g., flowrate, horsepower, etc.) accordingly. In some embodiments, the system 200 may comprise an actuator valve 202 or a pump 206, but not necessarily both. In some embodiments, the pump 206 can be disposed upstream of the filter assembly 102 and pump fluid into the filter assembly 102. A pressure sensor associated with the system (e.g., with the pump, the fluid conduit, the filter assembly 102, etc.) may be used to avoid over-pressuring the filter assembly 102 when the pump is disposed upstream of the filter assembly 102.

In order to ensure that the fluid is passed through the filter assembly 102 to remove the suspended solids from the fluid, a control system 210 may be implemented. The control system 210, which may be implemented in some contexts on a computer, may generally comprise a controller 212 comprising a memory 214 and a processor 216. The memory 214 may comprise a control program configured to operate on the processor. The control program may be suitable for controlling various portions of the system 200 to ensure that only authorized users have access to the system 200 and that the system functions as intended. The memory 214, the processor 216, and various other portions of a control system 210 suitable for implementing a control program are described in more detail below.

The controller 212 may be in signal communication with an input device 218 configured to accept an input from a user of the system 200 using a communication link 220. In an embodiment, the input may comprise an identification used to authenticate the user and allow access to the system 200. The input can comprise any type of identification such as a key code, a Personal Identification Number (PIN), a company identification number, an authorization code, various biometric indicators, or the like. The input device 218 may comprise a variety of devices based on the type of input used. For example, the input device may comprise an electronic device including, but not limited to, a key pad, a touch pad, a computer interface, a biometric sensor, and the like.

The controller can be in signal communication with the input device 218 over communication link 220, the actuator valve 202 over communication link 222, the pump 206 over communication link 224, and/or one or more components within the storage section 112 (e.g., one or more level sensors, temperature sensors, pressure sensors, the high pressure pump, etc.) over communication link 226. The communication links can comprise any type of link or communication media suitable for transferring a signal from the control system 210 to the respective device. In some embodiments, the communication links 220, 222, 224, 226 may include various types of direct communication media. For example, the input device 218 may be hard wired to the controller 212 over an electrical conductor. Other suitable direct communication media can include fiber optic cables, pneumatic lines, hydraulic lines, and the like. For example, the communication link 222 between the controller 212 and the actuator valve 202 may comprise a pneumatic control line for actuating the actuator valve 202, which may be a pneumatically controlled valve. In some embodiments, one or more of the communication links 220, 222, 224, 226 may comprise wireless communication links. For example, one or more types of wireless communication such as WiFi, BlueTooth, cellular communication channels, and the like may be used to establish a connection between the various components of the system and the controller 212 suitable for transferring data and commands. The various components (e.g., the input device 218, the actuator valve 202, the pump 206, components within the storage section 112, etc.) may comprise suitable communication equipment (e.g., receivers, transceivers, modems, sensors, electromechanical converts, etc.) for sending, receiving, and carrying out communications over the communication links 220, 222, 224, 226.

The control program can be stored in the memory 214 and executed by the processor 216 to configure the processor 216 to first detect an input on the input device 218. In an embodiment, the input may comprise an identification. Any suitable identification may be used such as a personal identification number (PIN), a company code, a password, a biometric indicator (e.g., a fingerprint, retinal scan, etc.), or any other suitable identifier. In an embodiment, a driver delivering a vessel 104 containing a fluid for injection may transport the vessel 104 to the facility and enter the identification into the input device 218. The identification may be transmitted to the control system 210 over the communication link 220. The control program may then be configured to verify an authorization of the user (e.g., the driver) to use the fluid injection system 200 based on the input from the input device 218. The control program may compare the received input with a database of authorized users, and upon verifying a match, may authenticate the user for use of the fluid injection system 200. If the control program is unable to locate a match for the input, the control system may simply fail to respond or authenticate the user. In some embodiments, the control system 210 may return a message to the input device 218 indicating that the user input was invalid or not identifiable. For example, a message may be displayed to the user indicating that the input was not valid or that the user is not authorized to operate the fluid injection system 200.

Upon verifying and/or authenticating the user for access to the fluid injection system 200, the control program may direct the control system 210 to allow fluid flow through the filter assembly 102 based on the verifying and/or authentication. In general, the user may couple the vessel 104 to the system before and/or after the user provides the input to the input device 218. At this point, the vessel 104 is in fluid communication with the fluid injection system 200 including the filter assembly 102. In order to provide the fluid flow, the actuator valve 202 can be actuated from a closed position to an open position, and the pump can be actuated to an on position (e.g., turned on) to draw fluid into the filter assembly 102. By linking the control system 210 to the actuator valve 202 and/or the pump 206, the system 200 helps prevent a pump associated with the vehicle or the vessel 104 from being used to pump through the fluid injection system 200 in an unauthorized manner.

The control program may then direct the fluid injection system 200 to operate and allow the fluid to be filtered through the filter assembly 102. Once the actuator valve 218 and the pump 202 are actuated, the fluid may be received from the vessel 104 into the filter assembly 102. The fluid can comprise suspended solids, at least a portion of which can be separated in the filter assembly 102. The fluid passing through the filter assembly 102 may be suitable for injection into the injection well 106 without damaging the injection well 106. The system may be maintained in the operating condition while fluid remains in the vessel 104. When the fluid in the vessel 104 has been transferred through the fluid injection system 200, the control program may direct the actuator valve 202 to a closed position and turn off the pump 206. The system 200 may then be reset to allow a subsequent volume of fluid to be processed through the system 200.

In some embodiments, the fluid injection system 200 may comprise an optional pre-filter 230. The pre-filter 230 can be configured to separate particles above a predetermined size from the fluid prior to the fluid passing through a filtration device within the filter assembly 102. In some embodiments, the pre-filter 230 may be useful in removing larger particles that could damage the filtration device in the filter assembly 102 and/or clog one or more conduits leading to and/or out of the filter assembly 102. The pre-filter 230 may be disposed upstream of the filter assembly 102 as shown in FIG. 2. In some embodiments, the pre-filter and/or an additional pre-filter may be disposed within the filter assembly 102 (e.g., upstream of a filtration device within the filter assembly 102). For example, a pre-filter 230 may be disposed within an inlet section of the filter assembly 102. In some embodiments, a pre-filter 230 may be disposed in a lower section of the filter assembly 102. For example, a strainer basket may be disposed within a sump or catch basin within the filter assembly 102 where it may collect larger solid particles such as rocks, drill cuttings, and the like that settle out of the fluid passing through the filter assembly 102. By locating the pre-filter 230 and/or an additional pre-filter within the filter assembly 102, the larger particles retained by the pre-filter may be prevented from passing to the solids collection vessel 240 as described in more detail below.

Various devices may be used as suitable pre-filters including strainer baskets, screen filters, settling chambers, centrifugal separators (e.g., vortex separators, cyclone separators, etc.), and the like. The pre-filter 230 may be configured to remove particles larger than about 0.25 inches, larger than about 0.1 inches, or larger than about 0.05 inches from the fluid prior to the fluid passing through a filtration device within the filter assembly 102. In addition to removing larger solid particles, the pre-filter may serve to remove one or more additional contaminants. For example, the pre-filter may comprise an optional chemical treatment for removing one or more chemical contaminants (e.g., treatment chemicals, gels, salts, etc.), and/or an oil-water separator for removing hydrocarbons. The pre-filter may be periodically cleaned or serviced to remove any contaminants and/or replace and filter elements such as adsorbents, filters, chemical treatments, etc. As described above, additional filters and/or separators may also be disposed downstream of the filter assembly 102 (e.g., in the storage section 112). In use, the optional pre-filter 230 may be used to remove at least a portion of the suspended solids from the fluid such as any solids above a predetermined size. The fluid may then pass through a filtration device within the filter assembly 102 for further separation of the suspended solids.

The portion of the suspended solids separated in the filter assembly 102 may be periodically removed. As noted above, various types of filtration devices may be used with the fluid injection system 200. For example, various types of removable and/or disposable filters (e.g., filter socks) may be used to capture the suspended particles. When the filtration device become full or saturated, the suspended solids and/or the entire filtration device may be removed and sent for disposal. In some embodiments, a filter assembly comprises a filtration device that remains in position within the filter assembly 102, as described in more detail below. In these embodiments, the suspended solids can collect within the filter assembly 102 during use.

In order to collect the separated solids to allow the filter assembly 102 to continue to operate, a solids collection vessel 240 may be used to periodically collect the suspended solids. The solids collection vessel 240 may assume several forms such as a sump, a tank, or the like. The solids collection vessel 240 can be sized to hold a suitable amount of fluid and the suspended solids, and the solids collection vessel 240 may comprise a weir or other means of decanting any collected fluids from the separated solids. In an embodiment, the solids collection vessel comprises a sump, which can comprise a pit or trough located below the facility. The sump may have an exposed top allowing the fluid and separated solids to flow into the sump. A grate or other cover may be used to limit entry into the sump. In some embodiments, the solids collection vessel 240 can comprise a tank or vessel that is in selective fluid communication with the filter assembly 102. The solids collection vessel 240 may be disposed below the filter assembly 102 to allow for gravity flow of fluid and solids into the solids collection vessel 240. If the solids collection vessel 240 is located level with and/or above the filter assembly 102, a pump or other transfer device can be used to transfer a fluid and any separated solids from the filter assembly 102 into the solids collection vessel 240. The solids collection vessel 240 can have a sloped bottom to aid in removing the contents of the solids collection vessel 240. For example, the solids collection vessel may be configured to separate any fluid flowing into the vessel from the solids based on gravity settling. The fluid may then be recycled back through the same filter assembly 102 or a different filter assembly 102 for injection into the injection well 106 while retaining the solids in the solids collection vessel 240, as described in more detail herein.

The solids collection vessel 240 can be coupled to a drain or outlet of the filter assembly 102. A drain actuator valve 242 may be disposed in a fluid conduit coupling the filter assembly 102 and the solids collection vessel 240 to selectively control the flow of fluid and/or solids from the filter assembly 102 to the solids collection vessel 240. The drain actuator valve 242 can be the same or similar to any of the valves described with respect to the actuator valve 202 herein. In some embodiments, the drain actuator valve 242 can be a manually actuated valve. In some embodiments, the drain actuator valve can comprise an automatically actuated valve and be connected to the control system 210 by a communication link 244, as described in more detail below. The communication link 244 may be the same or similar to any of the communication links described above.

During use of the fluid injection system 200, the drain actuator valve 242 would generally be configured in a closed position, thereby preventing fluid communication between the filter assembly 102 and the solids collection vessel 240. This configuration may prevent the fluid from flowing into the solids collection vessel 240 and rather flowing to the injection well 106. When the fluid injection system 200 is not being used to filter fluid for injection into the injection well 106, the actuator valve 202 may be closed and the drain actuator valve 242 may be opened. A cleaning cycle may be performed to remove the separated suspended solids from the filter assembly 102. As described in more detail below, a cleaning fluid may be used to clean the filtration device and wash the separated solids into a drain. The cleaning fluid may generally comprise fluid having passed through the filter assembly, though a different fluid such fresh water may also be used to clean the filter assembly 102. The fluids and the solids may then pass through the drain actuator valve 242 and into the solids collection vessel 240. Upon removal of some or all of the separated solids from the filter assembly 102, the drain actuator valve 242 can be closed and the fluid injection system 200 prepared for filtering additional fluid for injection.

In an embodiment, the control program may be configured to perform the cleaning cycle. When controlled by the control system 210, the cleaning cycle can be manually initiated and/or automatically initiated. In a manual initiation, an input may be received at the input device 218 and/or a separate input device used for the cleaning cycle. The cleaning cycle may then begin when the system is ready and the filter assembly 102 is not filtering a fluid. In an automatically initiated cleaning cycle, one or more sensors and/or the control program may automatically initiate a cleaning cycle. In some embodiments, pressure sensors may be disposed on either side of a filtration device within the filter assembly 102. The pressure sensors may detect a pressure differential across the filtration device. The control program may automatically initiate a cleaning cycle when either pressure on either side of the filtration device and/or a pressure differential across the filtration device exceeds a threshold. In some embodiments, a cleaning cycle may automatically be initiated based on various criteria including, for example, a predetermined number of uses of the fluid injection system 200 (e.g., after each use, after every other use, after every five uses, etc.), certain time intervals (e.g., once a day, once a week, once a month, etc.), a predetermined volume of fluid that is filtered, and the like.

In response to initiating the cleaning cycle, the control program may check the position of the actuator valve 202 using, for example, a valve position indicator. If the actuator valve 202 is in an open position, the control program may either close the actuator valve 202, or if a fluid is being filtered through the system, wait until the actuator valve 202 closes. When the actuator valve 202 is in the closed position, the controller 212 may send a signal over the communication link 244 to automatically actuate the drain actuator valve 242 to an open position. The control program may then direct the cleaning fluid to flow into the filter assembly 102, thereby washing at least a portion of the separated solids into the drain. The separated solids and the cleaning fluid may then pass out of the filter assembly 102 to the solids collection vessel 240. The cleaning fluid may flow into the filter assembly 102 for a predetermined period of time and/or until a predetermined volume of cleaning fluid is used. The control program may then cease flowing cleaning fluid into the filter assembly 102 and signal the drain actuator valve 242 to close. Once the drain actuator valve 242 is in a closed position, the control system 210 may be in a neutral position and ready to filter additional fluid through the filter assembly 102.

In some embodiments, the fluid injection system 200 may comprise an optional pad 246 configured to receive the vessel 104. The pad 246 may comprise a depression or other basin that is suitable to receive a vehicle and/or the vessel 104 containing the fluid to be filtered through the fluid injection system 200. The pad 246 may be substantially sealed to fluid flow out of the pad 246 through the sides and bottom. For example, the pad 246 may be formed from concrete, or alternatively have a water-proof or water-resistant lining (e.g., a polymer sheet lining, a clay lining, etc.). The pad 246 may be sloped to capture any fluid in a lower portion. This configuration may allow the pad 246 to capture any fluid leaks occurring during the transfer of the fluid from the vessel 104 into the fluid injection system 200. In some embodiments, the solids collection vessel 240 may extend below the pad 246. For example, the solids collection vessel 240 may comprise a sump that extends below the pad 246. A grate placed over the sump may be suitable for supporting any vehicles driving into the pad 246. Any fluid spilled on the pad 246 may then flow directly into the sump. In some embodiments, the pad 246 can comprise a drain in fluid communication with the solids collection vessel 240 through a drain line. The drain may or may not comprise a valve for selectively controlling the flow of fluid into the solids collection vessel 240. Since the pad 246 is expected to capture a relatively small volume of fluid, a valve in the drain line may not be needed. In use, at least a portion of the fluid leaving the vessel 104 or the vehicle and not entering the filter assembly 102 may be captured within the pad 246. This fluid may generally be referred to as spilled fluid. The spilled fluid may then be transferred to the solids collection vessel 240. Once in the solids collection vessel 240, the fluid and any solids in the fluid may be captured and removed upon cleaning out of the solids collection vessel 240.

The separated solids may be transferred into the solids collection vessel 240 with the cleaning fluid during a cleaning cycle, with the fluid to be filtered when spills are captures, and/or with the fluid to be filtered if the drain valve 242 is opened with fluid in the filter assembly 102. Thus, both fluid and the filtered solids may be transferred to and accumulate within the solids collection vessel 240. The filtered solids may be concentrated by separating the fluid from the solids within the solids collection vessel 240, for example through a fluid removal line 248. Various structures can be used to separate any fluids within the solids collection vessel 240 including, but not limited to, a weir, a drain line, a separate screen element, and the like. A valve system such as a float and valve system may be used to automatically drain the fluid from the solids collection vessel 240 when the fluid level within the solids collection vessel 240 rises above a certain level. The fluid may be removed from the solids collection vessel 240 and transferred back to the filter assembly 102 using a suitable fluid connection. In some embodiments, a dedicated fluid injection system comprising an inlet fluid conduit, a filter assembly 102, an actuator valve 202, and a pump 204 may be used to receive and filter the fluid from the solids collection vessel 240. By removing the fluid from the solids within the solids collection vessel 240, the solids may be concentrated for later removal and disposal. Further, the separation and filtration of the fluid in the solids collection vessel 240 may further aid in preventing a user from bypassing the fluid injection system by simply dumping the fluid to be filtered on the pad 246 and/or directly into the solids collection vessel 240 (e.g., directly into a sump under the pad 246).

The solids collection vessel 240 may be cleaned out to remove the accumulated separated solids. The solids collection vessel 240 functions to collect the solids separated from the fluid, and optionally, any solids captured in the pad 246. The solids and any fluid (e.g., the cleaning fluid) present in the solids collection vessel 240 may be removed for offsite disposal as the solids collection vessel 240 fills and/or at periodic intervals. In general, the solids collection vessel 240 may comprise a cleanout line or opening to allow the contents of the solids collection vessel 240 to be removed. For example, when the solids collection vessel 240 is a sump, the top may be open and readily accessible for cleaning out the solids. When the solids collection vessel 240 comprises a vessel, the vessel may have a lid or other opening to allow access to the solids within the vessel. In an embodiment, a vacuum truck and service may be used to clean out the sump 240 and remove the solids. The cleanout service may remove the separated solids without directly physically handling the solids, thereby improving the health and safety of the workers removing solids when the solids contain hazardous compounds (e.g., NORM, hazardous chemicals, etc.). The contents of the sump 240 may then be transported offsite for disposal at an appropriate location.

In addition to the configuration and arrangement of the control system 210 described above, the control system 210 may be used to perform various other actions during the operation of the system 200. In an embodiment, the control system 210 may be used to control and report on one or more components of the storage section 112. For example, the control system 210 may selectively operate the high pressure pump when the water storage tank reaches a threshold level, and shut off the high pressure pump when the water storage tank drops below a threshold. Similarly, the control system 210 may report the amount of hydrocarbons in the hydrocarbon storage tanks to allow an operator to arrange for transport and sale of the collected hydrocarbons. In addition, the control system 210 may be used to receive and record additional information about the fluid to be injected, the operator delivering the fluid, the system filtering and injecting the fluid, video from the fluid injection site, and the like. The additional information may be transmitted to an outside source. For example, the controller 212 may comprise a communication connection to an external server and send the information to the external server for a variety of purposes. For example, the control system may be communicatively coupled to the internet to provide a connection to a server external to the fluid injection site. In an embodiment, one or more items of information may be sent to a regulatory agency for automatically complying with various regulations of the injection system 200 and the injection well 106. In some embodiments, one or more items of information may be sent to an operator of the fluid injection system 200 to provide an update on the status of the system 200. This may be useful for unmanned facilities. For example, the use of the system can be remotely monitored through the receipt of information from the control system 210. Should any operational issues arise, one or more error messages may be sent from the control system 210, thereby indicating that repair technician is required. The error messages may comprise the results of one or more diagnostic tests, thereby allowing for the proper technician to be dispatched along with the proper tools and equipment to correct the issue.

While FIG. 2 illustrates the fluid injection system 200 comprising a single filter assembly 102 coupled to an actuator valve 202 and a pump 204, the fluid injection system 200 may comprise any number of components. In general, the fluid injection system 200 may be used to service a single vehicle and vessel 104. In order to service additional vehicles, a plurality of filter trains comprising corresponding filter assemblies 102, actuator valves 202, and pumps 206 may be used. For example, a multi-lane facility may have a dedicated filter train for each lane. Each of the filter trains may have the filter assemblies 102, actuator valves 202, and pumps 206 arranged in series, with the output of each filter train coupled to the storage section 112. As noted above, the fluid injection system 200 may comprise a dedicated filter train comprising a filter assembly 102, an actuator 202, and a pump 206 for use in filtering any fluid collected in the solids collection vessel 240. When multiple filter trains are present, the control system 210 may control all of the filter trains. In some embodiments, individual control systems may be used with each filter train. In some embodiments, the filter assembly 102, actuator valve 202, and pump 204 may be sized to handle fluid delivered from multiple vessels 104. For example, a plurality of fluid inlets may be in fluid communication with the filter assembly 102 for receiving fluid from a plurality of vessels 104, using for example a manifold or a plurality of fluid inlets to the filter assembly 102. The filter assembly 102 may be appropriately sized to handle the potential combined flow rate from all of the plurality of vessels 104 through the filter assembly 102. The various combinations and configurations of the fluid injection system 200 can allow a facility housing the fluid injection system 200 to be tailored to handle the injection needs of a particular injection well site.

In some embodiments, a portion of the fluid injection system 200 may be provided as a portable unit. For example, the filter assembly 102, the actuator valve 202, the pump 206, the control system 210, and the additional optional components associated with these units (e.g., the pre-filter 230, the solids collection vessel 240, the pad 246, the input device 218, etc.) may be provided as a portable unit. In general, a portable unit is capable of being manufactured in one location and transported to a desired location. For example, suitable portable units can include, but are not limited to, skid mounted units, container units, a truck or trailer mounted unit, a series of skid mounted, container, and/or trailer units, and the like. In this embodiment, the equipment may be configured to fit within a portable housing and can be further configured to operate within the housing when delivered to a suitable injection well site. The portable unit may be delivered to a well site and fluidly coupled and/or communicatively coupled (e.g., linked to the control system 210) to a storage section 212, which may in turn be coupled to an injection well 106. The ability to deliver at least a portion of the fluid injection system 200 as a portable unit may allow for the retrofitting of existing injection well systems and/or for the efficient installation of the fluid injection system at a new and/or converted wellbore. For example, an existing fluid injection system utilizing disposable filters can be retrofitted with the fluid injection system 200 described herein by delivering the portable unit and coupling it to an existing storage section 112, thereby replace the disposable filter system. The use of portable systems may also allow for efficient scaling of the fluid handling capabilities of an injection well site by allowing for the addition of modular fluid filtering trains.

Figure 3:
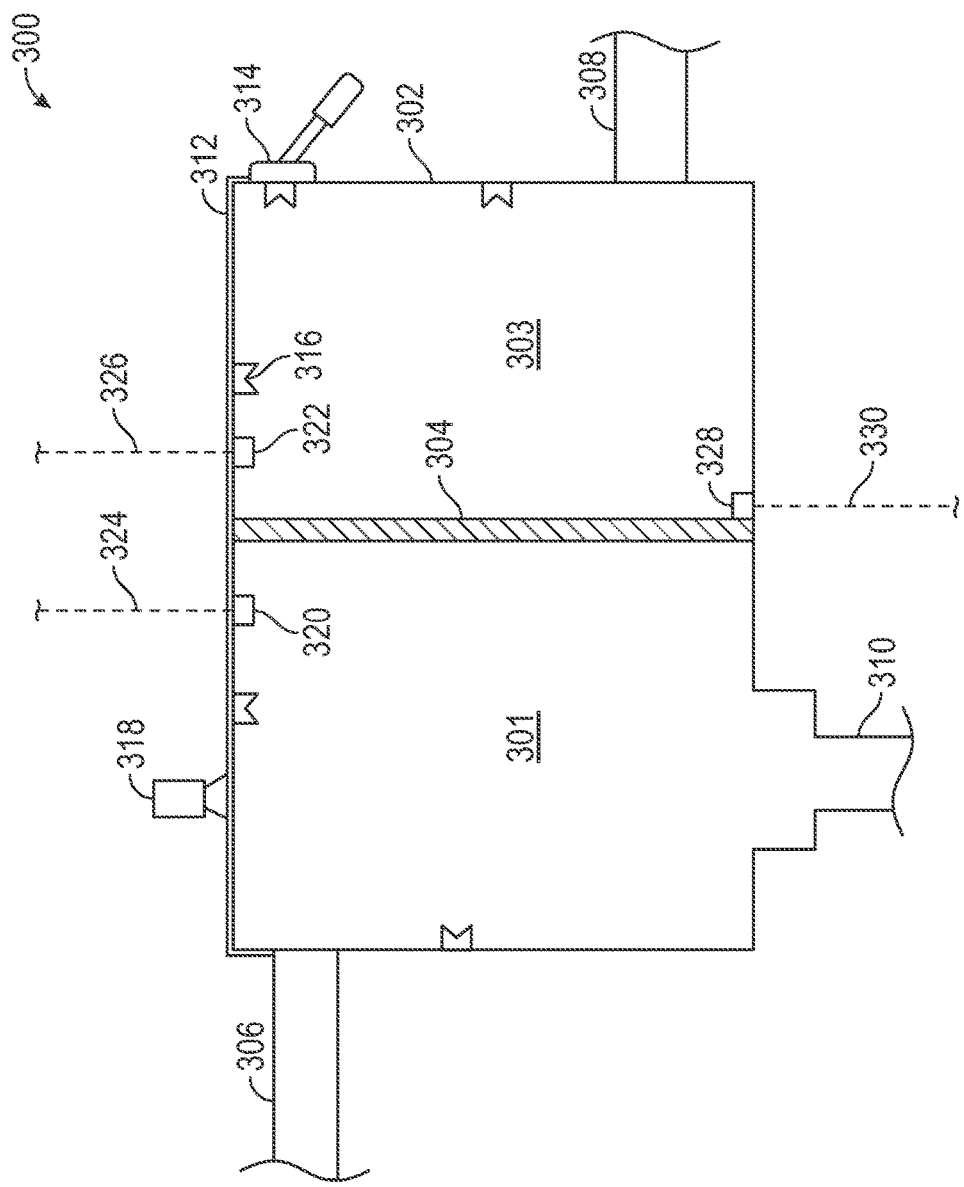
FIG. 3 illustrates a schematic cross-sectional view of a filter assembly according to an embodiment.

As noted above, the filter assembly may take various forms. A schematic cross-section of an embodiment of a filter assembly 300 is illustrated in FIG. 3. In an embodiment, the filter assembly 300 may be used as the filter assembly 102 described above with respect to FIGS. 1 and 2. In general, the filter assembly 300 may comprise a housing 302 containing a filtration device 304, a fluid inlet 306 for receiving the fluid to be filtered, a fluid outlet 308 passing the filtered fluid downstream, and a drain 310 that may provide fluid communication with a solids collection vessel (e.g., solids collection vessel 240 as shown in FIG. 2). The filter assembly 300 may comprise several optional components such as a one or more nozzles 316 configured to allow the filtration device 304 and housing 302 to be cleaned, a vent 318 configured to selectively provide fluid communication with the interior of the housing 302, and/or one or more sensors for detecting various parameters within the housing 302.

The housing 302 serves to provide a substantially sealed chamber for containing the various components of the filter assembly 300. The filter assembly 300 depicted in FIG. 3 shows the housing 302 comprising a generally rectangular cross-section. While shown as rectangular, various other cross-sections may also be possible. For example, the housing 302 may take the form of a cylindrical vessel or tank. The housing 302 can be configured to maintain an expected operating pressure within the chamber during use. In general, the housing 302 may be formed from a suitable material to allow the pressure to be maintained during use. For example, the housing 302 may be formed from a metal, a polymer, a composite material, or other suitable material. The housing 302 can also be sized to provide a suitable space velocity through the housing 302 and filtration device 304 during use.

The housing 302 may comprise multiple components to allow for access to the chamber formed within the housing 302. In an embodiment, the housing 302 may comprise a cover 312 configured to selectively engage the housing 302 body. One or more seals may be disposed between the cover 312 and the body to form a sealing engagement. In general, the use of a pump to pull fluid into the housing 302 may create a vacuum (relative to atmospheric pressure) within the tank, and the seals may be configured to provide a sealing engagement under a vacuum condition. Various types of connection devices may be used to couple the components of the housing 302. As shown in FIG. 3, one or more latches 314 may be used to maintain the engagement between the cover 312 and the body, though other connection devices such as bolts, screws, clamps, threaded connections, and the like may also be used.

The filtration device 304 is generally disposed in the housing 302 such that the filtration device 304 divides the chamber into an inlet portion 301 and an outlet portion 303. The fluid inlet 306 is disposed in the housing 302 and is configured to receive a fluid comprising the suspended solids into the inlet portion 301 of the chamber. Similarly, the fluid outlet 308 is disposed in the housing 302 and is configured to pass the fluid out of the housing 302 from the outlet portion 303 once it has passed through the filtration device 304. The filtration device 304 is configured to separate at least a portion of the suspended solids from the fluid and retain the separated solids in the inlet portion 301 of the housing 302.

Figure 4:
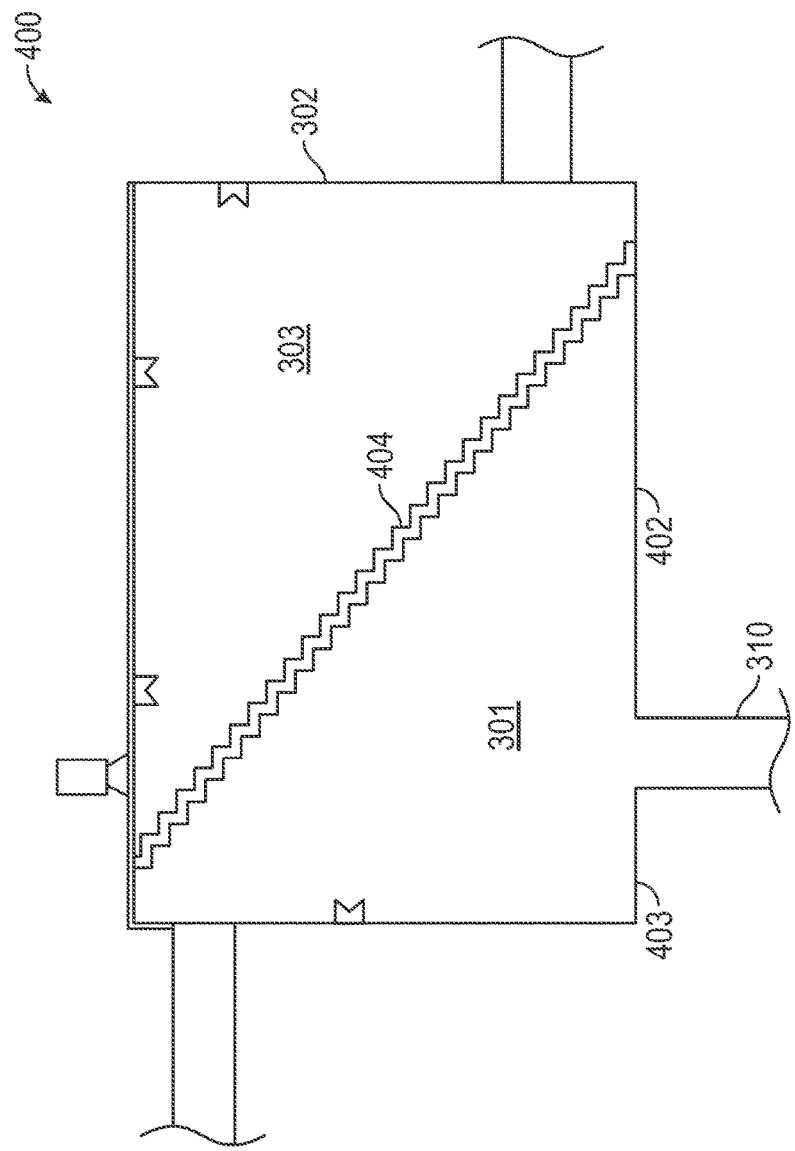
FIG. 4 illustrates a schematic cross-sectional view of another filter assembly according to an embodiment.

The drain 310 is disposed in the housing 302 and is configured to pass the portion of the suspended solids removed from the fluid out of the inlet portion 301 of the housing 302. A portion of the fluid may pass with the separated suspended solids out of the drain 310. In an embodiment, the drain 310 may be coupled to a solids collection vessel as described above. The drain 310 may generally be disposed in a lower portion of the housing 302 to allow any solids that settle out of the fluid after being separated by the filtration device 304 to be passed through the drain 310. In an embodiment as shown in FIG. 4, a lower portion of the housing 302 may be sloped to aid in collecting the solids near the drain 310 and allowing the solids to pass out of the drain 310 when the drain 310 is opened. For example, the lower surfaces 402, 403 may be sloped towards the drain 310. In some embodiments, a catch basin may be formed in the housing 302 at or near the drain to collect the separated solids. A strainer basket may be disposed in the catch basin to prevent larger solids from passing through and potentially clogging the drain. While shown as being disposed in the lower surface of the housing 302 in FIGS. 3 and 4, the drain 310 may be disposed above the bottom of the housing 302, and the solids may be carried out of the drain 310 by being re-suspended in a fluid and passed out with the fluid through the drain 310.

As shown in FIG. 3, the filtration device 304 cooperates with the housing 302 so that the fluid entering through the fluid inlet 306 and exiting through the fluid outlet 308 passes through the filtration device 304. The filtration device 304 can be formed in a rectangular, square, round, elliptical, trapezoidal, cylindrical, or any other shape configured to cooperate with the shape of the housing 302. In general, the edges on the perimeter of the filtration device 304 can form a seal against one or more internal surfaces of the housing 302 to reduce or prevent channeling of fluid around the filtration device 304. In some embodiments, a frame or holder may be disposed within the housing 302 to receive the filtration device 304.

The filtration device 304 may be sized to provide a suitable filtration area for a desired application. In general, the greater the surface area of the filtration device 304, the greater is the volume of fluid that can be filtered through the filtration device 304 for a given pressure drop. In general, the filtration device 304 may be sized to allow the filtration device 304 to be removed from the housing 302, when needed, and replaced. For example, if the filtration device 304 becomes worn or damaged, a technician can access the housing 302 and replace the filtration device 304.

The filtration area through the filtration device 304 may be affected by the length and width of the filtration device 304, the orientation of the filtration device 304 within the housing 302, and the design of the filtration device 304. As shown in FIG. 3, the filtration device may comprise a planar screen oriented substantially perpendicular to the interior surfaces of the housing 302. The filtration device 304 may be arranged perpendicular to the width or length of the housing, wherein the orientation can affect the amount of filtration area available for a rectangular housing. In general, as the angle of the filtration device 304 varies from perpendicular with respect to the interior surfaces of the housing 302, the filtration area will increase. As shown in FIG. 4, the filtration device 404 may be disposed at a non-perpendicular angle with respect to the interior of the housing 302, and the filtration area of the filtration device 404 may be increased relative to the orientation of the filtration device 304 illustrated in FIG. 3.

The design of the filtration device may also affect the filtration area. As shown in FIG. 3, the filtration device 304 may comprise a planar construction. A greater filtration area may be achieved using a pleated, corrugated, folded, or other non-planar design. For example, FIG. 4 illustrates a pleated filtration device 404 configured to provide additional filtration area for filtering solids from the fluid. While a greater surface area may be obtained by appropriately orienting the filtration device 304 and providing a non-planar design, such considerations may be balanced by the ability to clean the filtration device 304 should it become clogged or otherwise impeded by the filtered solids.

In order to receive the fluid and separate at least a portion of any suspended solids from the fluid, the filtration device 304 can comprise one or more layers configured to remove the particulates from the fluid as well as optional structural support layers. Referring to FIG. 3, various types of filter media may be used to form the filtration device 304. In an embodiment, the filtration device 304 may comprise a type of porous media such as a woven, non-woven, or felted material constructed of a suitable material. Suitable materials may comprise metals, polymers, ceramics, natural or synthetic fibers, and/or any combination thereof. In an embodiment, the filtration device 304 may comprise a metallic screen. Additional filter media may also be used such as granular and/or particulate media such as diatomaceous earth, carbon, zeolites, structured packing, and any combination thereof. When a granular or particulate media is used in the filtration device 304, it may be stabilized between adjacent layers of porous media to retain the material in position. When multiple layers are used to form the filtration device, each layer can be implemented using a single layer of filter media, or with multiple layers of filter media, either bonded together to form a single layer or as separate layers.

The filtration device 304 may also comprise one or more structural support layers such as structural screen, wires, mesh, perforated metal sheets, or the like. A structural support layer may be configured to retain any filter media in position in the flow path of the fluid and resist deformation of the filter media during the operation of the fluid injection system. In general, the structural support layer may be disposed on the downstream side of the filtration device 304, though other configurations are possible. While the structural support layers may provide a filtration function to some degree, the pore size through the structural support may be substantially larger than the pore size through the filter media used to separate the one or more suspended solids from the fluid.

The porosity of the filter media may vary depending on the number of layers, the size of any fibers used to form the filter media, and the pore size formed by the filter media. When multiple layers of filter media are present, the layers may each have the same or different construction and/or pore size. The use of a plurality of different layers and/or filter media may allow a range of particle sizes to be filtered. In an embodiment, the filtration device 304 may have a filter size of less than about 1,000 microns, less than about 500 microns, less than about 300 microns, less than about 200 microns, or less than about 100 microns. In an embodiment, the filtration device 304 may have a filter size of greater than about 5 microns, greater than about 10 microns, greater than about 20 microns, greater than about 30 microns, or greater than about 50 microns.

In an embodiment, the filter assembly 300 may optionally comprise one or more nozzles 320. The nozzles 320 may generally be disposed on the interior of the housing 302 and coupled to a source of fluid. For example, the nozzles 320 may be coupled to a source of cleaning fluid used for performing a cleaning cycle as described above. The nozzles 320 may be fixed in position or configured to move, thereby providing a multidirectional spray pattern. At least a portion of the nozzles 320 may be oriented to spray the filtration device 302 with the fluid to dislodge and wash and solids into the inlet portion 301 of the housing 302. Some nozzles may be oriented to spray the inlet portion 301 of the housing 302 to wash any solids settling to the bottom of the housing 302 into the drain 310. Various types of nozzles and any suitable number of nozzles may be used.

In an embodiment, the filter assembly 300 may optionally comprise a vent 318. The filter assembly 300 may be designed to handle both liquids and gases. Based on the design of the filter assembly 300, gas may become trapped at the top of the filter assembly 300 during use, thereby excluding liquid from the top of the filter assembly 300. The vent 318 may serve to release the gas during use to allow the fluid to fill the housing 302. The vent 318 may therefore be disposed at or near the top of the housing 302. In an embodiment, the vent 318 may comprise a one-way valve configured to release gas from within the housing 302 while preventing gas from entering the housing 302 during operation of the system. Suitable vents 318 may comprise check valves, poppet valves, manual valves, or the like. In some embodiments, the vent 318 may comprise a two-way safety valve and allow gas to enter the housing 302, for example, during a low pressure condition to prevent the housing 302 from collapsing. In an embodiment, a fluid line may couple the vent 318 to the solids collection vessel 240 to recapture any gases and/or fluids passing through the vent. In some embodiments, the vent 318 may provide fluid communication to the surrounding atmosphere.

In an embodiment, the filter assembly 300 may optionally comprise one or more pressure sensors 320, 322. The pressure sensors may serve to detect a pressure in the inlet portion 301 and/or the outlet portion 303 of the housing 302. The pressure sensors 320, 322 may be coupled to a control system (e.g., control system 210 as described with respect to FIG. 2) using communication links 324, 326, respectively, to provide an input for use in determining the operating conditions and/or initiating a cleaning cycle. The communication links 324, 426 may comprise any of the types of communication links described with respect to FIG. 2. The pressure sensors may comprise any pressure sensors suitable for determining fluid pressure. The use of at least one pressure sensor on each side of the filtration device 304 may allow the fluid pressure differential across the filtration device 304 to be determined. In an embodiment, the fluid pressure differential across the filtration device 304 may be used to determine when a cleaning cycle is needed for the filter assembly 300.

In some embodiments, a filtration device position sensor 328 may be used to detect when the filtration device 304 is disposed in the housing 302. A variety of sensors may be used as positioning sensors 328. The positioning sensor 328 may be coupled to a control system (e.g., control system 210 as described with respect to FIG. 2) using a communication link 330. The positioning sensor 328 may be used to provide an interlock for the operation of the fluid injection system, such as described above with respect to FIG. 2. In general, the system may be used to prevent the filter assembly 300 from being bypassed and allowing fluid containing solids above a certain size and/or concentration from reaching the injection well. In order to prevent a user from removing the filtration device 304 and operating the system, the positioning sensor 328 may be used to ensure that the filtration device 304 is in position before allowing the system to operate. The positioning sensor 328 may also detect when a filtration device 304 is improperly positioned within the housing 304. In either case, the position of the filtration device 304 can be communicated to the control system to indicate that the system should not operate until the filtration device 304 is properly positioned.

Referring to FIGS. 2 and 3, the control system 212 may be configured to detect the position of the filtration device 304 within the filter assembly 300 before taking any actions (e.g., in response to any other inputs). When an input is received at the input device 218, the control system may receive the position of the filtration device from the positioning sensor 328 over the communication link 330. If the filtration device is properly positioned, the system may operate as described above. When the filtration device 304 is not properly positioned, the system may simply not initiate any other actions. In some embodiments, a message may be provided to the user indicating that the filtration device 304 should be repositioned or replaced. Once the filtration device is properly positioned, the fluid injection system 200 can then be operated normally. In addition to preventing any use of the system 200, the control system may send a message to an external server indicating that the filtration device 304 is not properly positioned to allow for a technician to be dispatched to repair and/or replace the filtration device 304.

In use, the filter assembly 300 may operate by receiving a fluid in the housing 302 through the fluid inlet 306. The fluid may enter the inlet portion 301 of the housing and pass through the filtration device. As the fluid passes through the filtration device 304, at least a portion of any solids in the fluid may be separated from the fluid and be retained in the inlet portion 301 of the housing 302. The fluid may then pass into the outlet portion 303 of the housing 302 before passing through the fluid outlet 308 to leave the filter assembly 300. The separated solids may collect in the inlet portion 301 of the housing 302. The solids may be passed through the drain 310 by opening the drain 310 and allowing the solids to pass out of the drain 310. Some amount of fluid may pass through the drain 310 with the fluid in order to wash the separated solids down the drain 310. Once the drain 310 is closed, the filter assembly 300 may be ready to resume filtering fluid through the filtration device 304.

As described above, a cleaning cycle may be used to clean the filtration device 304 and remove the separated solids from the filter assembly 300. During a cleaning cycle, the optional nozzles 316 may be supplied with fluid such as the cleaning fluid. The fluid may pass out of the nozzles 316 and impact the filtration device 304. The fluid may generally pass from the outlet portion 303 of the housing 302 to the inlet portion 301 of the housing 302. The backwashing of the filtration device 304 may then wash and flow any removed solids from the filtration device 304 back into the inlet portion 301. The orientation of the filtration device 304 within the housing 302 may aid in allowing the solids to be washed from the filtration device 304 and collect at the bottom of the housing 302.

Once the solids are washed into the inlet portion 301, the flow of the fluid through the filtration device 304 may carry the solids into the drain 310, which may be coupled to a solids collection vessel. In some embodiments, one or more nozzles 316 may be configured to spray the housing 302 and wash any solids from one or more surfaces of the housing 302. For example, one or more nozzles 316 may be used to wash the bottom of the housing 302 by directing a fluid towards the drain 310. Any solids settling out of the fluid and resting on the bottom of the housing 302 can then be washed into the drain 310 by the fluid.

Figure 5:
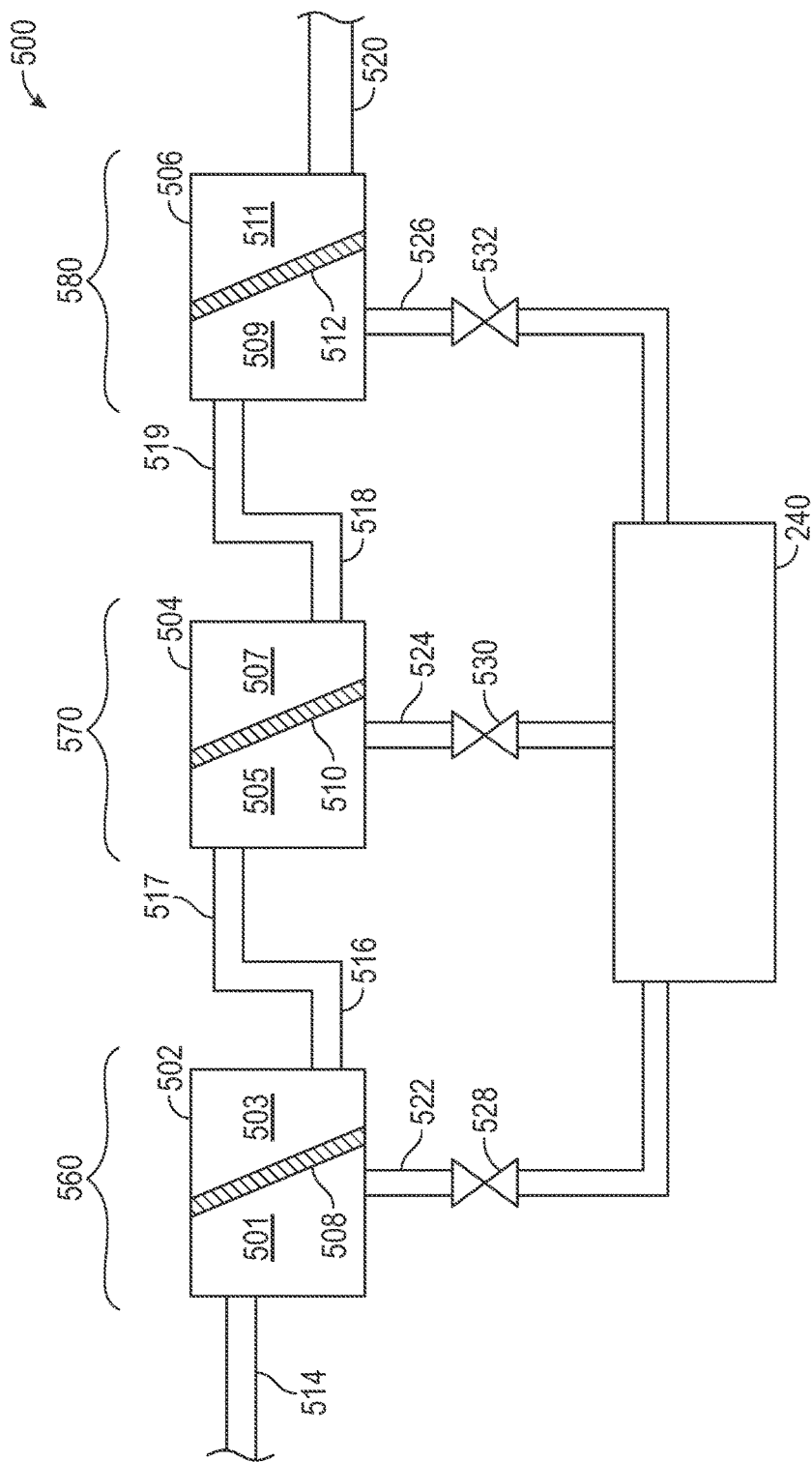
FIG. 5 illustrates a schematic cross-sectional view of still another filter assembly according to an embodiment.

While the filter assemblies 300, 400 are described with respect to FIGS. 3 and 4 as comprising a single housing 302 and filtration device 304, higher fluid volumes may be handled through the system with a greater filtering efficiency by providing a filter assembly comprising a plurality of filtration devices. In an embodiment, the plurality of filtration devices may be contained within separate filter sections disposed in series. As shown in FIG. 5, a filter assembly 500 comprises a plurality of filter sections 560, 570, 580, where the filter sections 560, 570, 580 are disposed in series. The filter assembly 500 may be similar to the filter assemblies 300, 400 described with respect to FIGS. 3 and 4, and the filter assembly 500 may also be used as the filter assembly 102 described with respect to FIG. 2.

The filter assembly 500 can comprise a plurality of filter sections 560, 570, 580. A first filter section 560 can comprise a first housing 502 comprising a first filtration device 508, a second filter section 570 can comprise a second housing 504 comprising a second filtration device 510, and a third filter section 580 can comprise a third housing 506 comprising a third filtration device 512. Each housing 502, 504, 506 is divided into a corresponding inlet portion 501, 505, and 509, respectively, and a corresponding outlet portion 503, 507, and 511, respectively. The filter sections 560, 570, 580 and corresponding housings 502, 504, and 506 are disposed in series, with the first fluid inlet 514 disposed in the first housing 502 and configured to receive a fluid into the first inlet portion 501 of the first housing 502. A first fluid outlet 516 is disposed in the first housing and is configured to pass a fluid out of the first outlet portion 503 of the first housing 502. The first fluid outlet 516 is coupled to a second fluid inlet 517 disposed in the second housing 504 and configured to receive a fluid into the second inlet portion 505 of the second housing 504. A second fluid outlet 518 is disposed in the second housing 504 and is configured to pass a fluid out of the second outlet portion 507 of the second housing 504. The second fluid outlet 518 is coupled to a third fluid inlet 519 disposed in the third housing 506 and configured to receive a fluid into the third inlet portion 509 of the third housing 506. A third fluid outlet 520 is disposed in the third housing 506 and is configured to pass a fluid out of the third outlet portion 511 of the third housing 506. Each housing 502, 504, 506 comprises a drain 522, 524, 526, respectively, that is coupled through a drain valve 528, 530, 532, respectively, to the solids collection vessel 240. While three filter sections 560, 570, 580 are shown in FIG. 5, any number of filter sections may be used with the filter assembly 500. For example, two filter sections may be used, or alternatively, four or more filter sections may be used.

The plurality of filtration devices 508, 510, 512 in each corresponding filter section 560, 570, 580 may comprise a decreasing pore size as the fluid passes through the series of housings 502, 504, 506 so that each successive filtration device filters a smaller particle size. The decreasing pore sizes may allow a first portion of the solids to be filtered in the first filtration device 508, a second portion of the solids to be filtered in the second filtration device 510, and a third portion of the solids to be filtered in the third filtration device 512. Each portion may comprise a smaller average diameter. For example, the first filtration device 508 may be configured to filter particles larger than an amount between about 1,000 microns and about 500 microns, the second filtration device 510 may be configured to filter particles larger than an amount between about 500 microns and about 200 microns, and the third filtration device 508 may be configured to filter particles larger than an amount between about 200 microns and about 10 microns. These sizes are illustrative only and the decreasing pore size may vary based on the expect particle size distribution and filtering requirements for the injection well.

The separated solids may all pass through the respective drains to a single solids collection vessel. In some embodiments, separate solids collection vessels may be provided for one or more of the housings 502, 504, 506. The housings 502, 504, 506 and corresponding filtration devices 508, 510, 512 may comprise any of the components described above with respect to the filter assemblies of FIGS. 3 and 4. For example, one or more of the filter sections 560, 570, 580 and corresponding housings 502, 504, 506 may comprise the optional components such as a one or more nozzles 316, a vent 318, and/or one or more sensors for detecting various parameters within the housing 302. When a cleaning cycle is performed for the filter assembly 500, the filter sections 560, 570, 580 may be cleaned at the same time, or less than all of the filter sections 560, 570, 580 may be cleaned. For example, if the third filter section 580 is expected to separate a lower volume of solids from the fluid, the third filter section 580 may be cleaned less often than the first filter section 560 and/or the second filter section 570. A differential cleaning cycle schedule may limit the amount of fluid collected in the solids collection vessel.

In use, the filter assembly 500 may operate as described above. In general, the fluid to be filtered for injection may pass into the first filter section 560 through the first fluid inlet 514. The fluid may pass through the first filtration device 508, and a first portion of the solids in the fluid may be separated and retained in the first inlet portion 501. The fluid may then pass out of the first fluid outlet 516 and pass to the second fluid inlet 517. The fluid may pass through the second filtration device 510, and a second portion of the solids in the fluid may be separated and retained in the second inlet portion 505. The fluid may then pass out of the second fluid outlet 518 and pass to the third fluid inlet 519. The fluid may pass through the third filtration device 512, and a third portion of the solids in the fluid may be separated and retained in the third inlet portion 509. The fluid may then pass out of the third fluid outlet 520 and pass through the various downstream components (e.g., an actuator valve, a pump, the storage section, etc.) for injection into the injection well.

When the filter assembly 500 is not being used to filter a fluid for injection into the injection well, one or more cleaning cycles may be performed to clean the separated solids from one or more of the filter sections 560, 570, 580. When a cleaning cycle is to be performed for a filter section, the corresponding drain actuator valve 528, 530, 532 can be actuated to an open position, and a cleaning fluid can be supplied to the corresponding housing 502, 504, 506. When nozzles are present within the housing, the fluid may be supplied to the nozzles to wash the solids out of the housing and into the drain 522, 524, 526. The solids may then pass to the solids collection vessel where they may collect for later removal. The corresponding drain actuator valves 528, 530, 532 can then be closed and the system returned to a neutral state. In an embodiment, all of the filter sections 560, 570, 580 can be cleaned at the same time. In some embodiments, less than all of the filter sections 560, 570, 580 are cleaned at the same time. For example, the cleaning cycle may be performed based on an input from one or more sensors, and only those filter section(s) meeting a threshold (e.g., a pressure differential threshold across a filtration device) may be cleaned.

Figure 6:
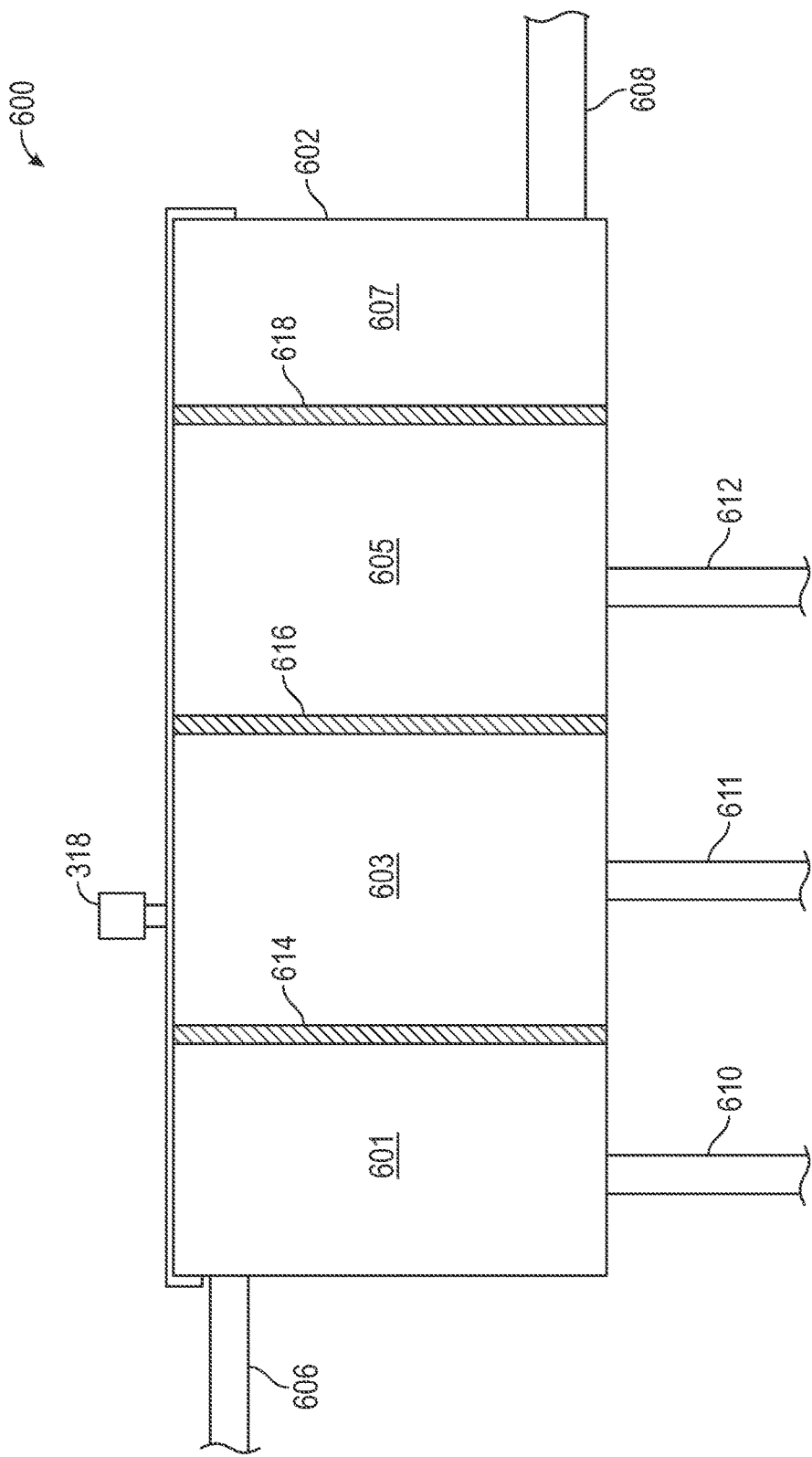
FIG. 6 illustrates a schematic cross-sectional view of yet another filter assembly according to an embodiment.

In an embodiment, the plurality of filtration devices may be contained within a single housing 302. As shown in FIG. 6, a filter assembly 600 comprises a plurality of filtration devices 614, 616, 618 disposed within a single housing 602. The filtration devices 614, 616, 618 separate the housing 602 into a plurality of sections including an inlet section 601, a second section 603, a third section 605, and an outlet section 607. The filtration devices 614, 616, 618 are disposed in series within the housing 602 such that a fluid passing through the housing 602 is forced through each filtration device 614, 616, 618 sequentially. The filtration devices 614, 616, 618, the housing 602, and the optional components (e.g., vent 318) may be the same or similar to those elements described above with respect to FIGS. 3 and 4. In an embodiment, the filter assembly 600 may also be used as the filter assembly 102 described with respect to FIG. 2.

A fluid inlet 606 is disposed in the housing 602 and is configured to receive the fluid to be filtered into the inlet section 601. A fluid outlet is configured to pass the filtered fluid out of the housing 608 from the outlet section. Each of the inlet section, the second section 603, and the third section 605 comprise a drain 610, 611, 612, respectively, for passing the separated solids and/or a portion of fluid out of the housing 602. The drains 610, 611, 612 may provide fluid communication with a single solids collection vessel or alternatively, a plurality of solids collection vessels. While three filtration devices 614, 616, 618 are shown in FIG. 6, any number of filtration devices may be used with the filter assembly 600. For example, two filtration devices may be used, or alternatively, four or more filtration devices may be used.

The plurality of filtration devices 614, 616, 618 may comprise a decreasing pore size as the fluid passes through the series of filtration devices 614, 616, 618 within the housing 602 so that each successive filtration device filters a smaller particle size. The decreasing pore sizes may allow a first portion of the solids to be filtered in the first filtration device 614 and retained in the inlet section 601, a second portion of the solids to be filtered in the second filtration device 616 and retained in the second section 603, and a third portion of the solids to be filtered in the third filtration device 618 and retained in the third section 605. Each filtration device may comprise a smaller average filtering diameter. For example, the first filtration device 614 may be configured to filter particles larger than an amount between about 1,000 microns and about 500 microns, the second filtration device 616 may be configured to filter particles larger than an amount between about 500 microns and about 200 microns, and the third filtration device 618 may be configured to filter particles larger than an amount between about 200 microns and about 10 microns. These sizes are illustrative only and the decreasing pore size may vary based on the expect particle size distribution and filtering requirements for the injection well.

The housing 602 and corresponding filtration devices 614, 616, 618 may comprise any of the components described above with respect to the filter assemblies of FIGS. 3 and 4. For example, one or more optional components such as a one or more nozzles, a vent 318, and/or one or more sensors for detecting various parameters within the housing 602 may be associated with one or more of the sections 601, 603, 605, 607. When a cleaning cycle is performed for the filter assembly 600, the filtration devices 614, 616, 618 may be cleaned at the same time, or less than all of the filter sections 614, 616, 618 may be cleaned. For example, if the third filtration device 618 is expected to separate a lower volume of solids from the fluid than the first filtration device 614 or the second filtration device 616, then the third filter section 580 may be cleaned less often than the filtration devices 614, 616. In an embodiment, drain actuator valves may be associated with each drain 610, 611, 612, thereby allowing for selective fluid communication from each section s601, 603, 605. Alternatively, a single drain actuator valve may be coupled to a common drain line that is coupled to each of the drain lines 610, 611, 612, and a differential cleaning cycle may be performed based on the selection of cleaning nozzles provided with cleaning fluid. A differential cleaning cycle schedule may limit the amount of fluid collected in the solids collection vessel.

In use, the filter assembly 600 may operate as described above with respect to FIGS. 3 and 4. In general, the fluid to be filtered for injection may pass into the inlet section 601 through the fluid inlet 606. The fluid may pass through the first filtration device 614, and a first portion of the solids in the fluid may be separated and retained in the inlet portion 601. The fluid may then pass into the second section 603 before passing through the second filtration device 616 where a second portion of the solids in the fluid may be separated and retained in the second portion 603. The fluid may then pass into the third section 605 before passing through the third filtration device 618 wherein a third portion of the solids in the fluid may be separated and retained in the third portion 605. The fluid may then pass into the outlet section 607 and into the fluid outlet 608. The fluid may then pass through the various downstream components (e.g., an actuator valve, a pump, the storage section, etc.) for injection into the injection well.

When the filter assembly 500 is not being used to filter a fluid for injection into the injection well, one or more cleaning cycles may be performed to clean the separated solids from one or more of the sections 601, 603, 605. When a cleaning cycle is to be performed for a section, a corresponding drain actuator valve can be actuated to an open position when a plurality of drain actuator valves are used, or a single drain actuator valve coupled to each drain 610, 611, 612 may be actuated. When nozzles are present within the housing, the fluid may be supplied to the nozzles to wash the solids out of the housing and into one or more of the drains 610, 611, 612. The solids may then pass to the solids collection vessel where they may collect for later removal. The corresponding drain actuator valves can then be closed and the system returned to a neutral state. In an embodiment, all of the filtration devices 614, 616, 618 can be cleaned at the same time. In some embodiments, less than all of the filtration devices 614, 616, 618 are cleaned at the same time. For example, the cleaning cycle may be performed based on an input from one or more sensors, and only those filter section(s) meeting a threshold (e.g., a pressure differential threshold across a filtration device) may be cleaned.

The use of the filter assembly 500 comprising a plurality of filter sections 560, 570, 580 and/or the filter assembly 600 comprising a plurality of filtration devices in a single housing may be used in any combination to provide the desired level of filtering of a fluid. The use of the filter assembly 500 and/or the filter assembly 600 may provide redundant filtering capabilities to reduce the occurrence of solids passing to the injection well. Should a single filtration device fail or become damaged or bypassed, the remaining filtration devices may remain in position to filter the fluid for injection. Further, the use of filtration devices having different mesh sizes may allow a larger volume of fluid to be filtered through the filter assembly 500.

The filter assemblies described herein may form a portion of a portable filtration device. For example, any of the filter assemblies 300, 400, 500, and/or 600 may form a portion of a portable unit with or without any other components of the fluid injection system described herein. In an embodiment, a filter assembly may be provided on a trailer or other transportation device. The filter assembly may be transported to a drilling and/or producing well site for use in filtering a produced fluid at the well site. For example, the filter assembly may be used at a drilling site to filter recovered water prior to the water being transported offsite for disposal (e.g., using a fluid injection system as described herein). The filtration device within the filter assembly may comprise a larger pore size than a stationary filter assembly, which may allow the filter assembly to serve as a pre-filter for the fluid prior to the fluid being sent for filtration through the fluid injection system. In some embodiments, the filtration device may be situated at a well site and used to filter the fluid prior to re-use and/or reinjection of the fluid into the wellbore from which the fluid was produced. For example, the filter assembly may be used to filter produced water for reinjection or provide a particle filter for a drilling mud after it has passed through the drill cutting screens (e.g., shaker screens, a settling pit, etc.). The use of the filter assemblies described herein may allow for a system to be used that is free from disposable filtration devices, thereby simplifying the system and reducing the environmental waste associated with the disposable filtration devices. Various other uses for the filter assemblies described herein where suspended solids are to be removed from a fluid are within the scope of this disclosure.

Figure 7:
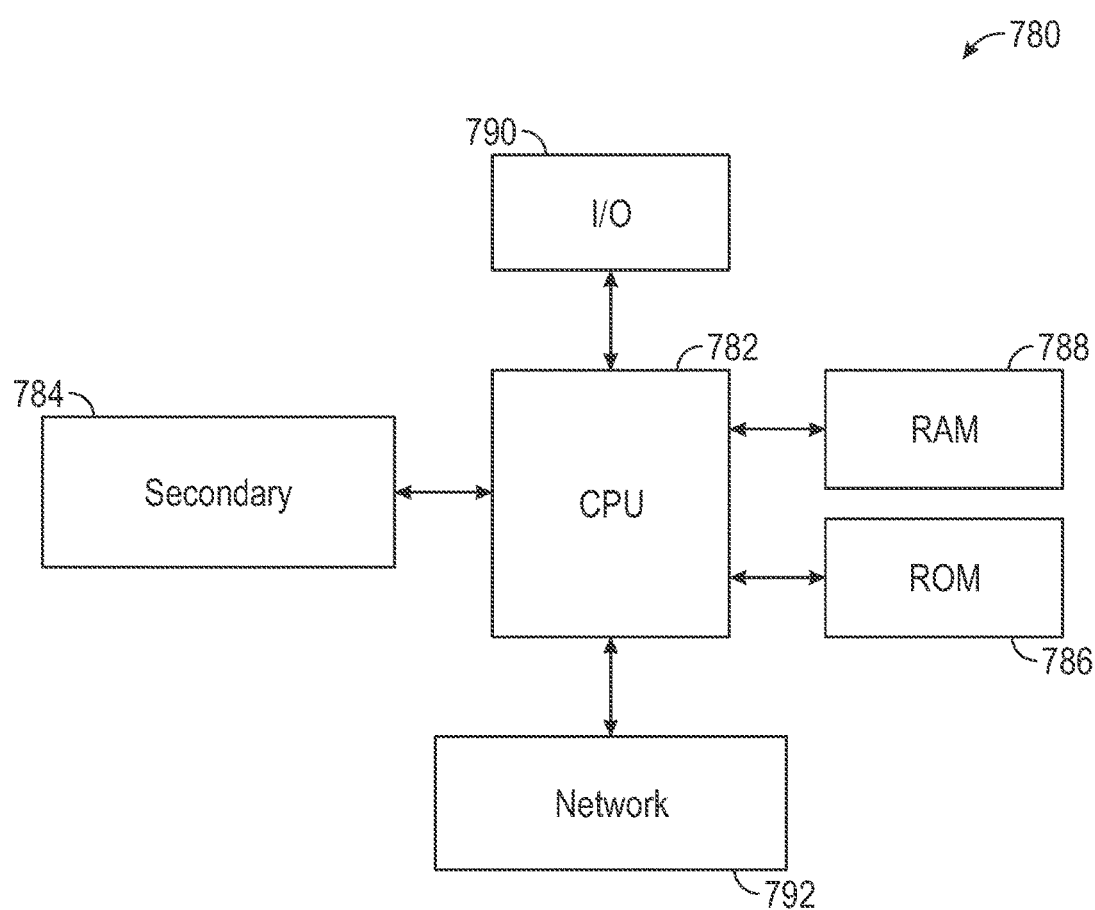
FIG. 7 illustrates a schematic layout view of computer system suitable for operating a control system according to an embodiment.

FIG. 7 illustrates a computer system 780 suitable for implementing one or more embodiments disclosed herein. For example, the control system 210 described with respect to FIG. 2 may be implemented on the computer system 780 as well as one or more components of the control program stored in the memory. The computer system 780 includes a processor 782 (e.g., such as processor 216 of FIG. 2), which may be referred to as a central processor unit or CPU, that is in communication with memory devices (e.g., memory 214 of FIG. 2) including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions (the control program described with respect to FIG. 2) onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, biometric input devices, or other well-known input devices. In an embodiment, the input device 218 of FIG. 2 may comprise any of the I/O devices 790 described herein.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. In some embodiments, the network connectivity devices 792 may enable the processor 782 to communicate with one or more of the components of the fluid injection system 200 over one or more of the communication links 220, 222, 224, 226, 244. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

Having described the various tools, systems, and method herein, embodiments may include, but are not limited to:

A method of injecting fluid into an injection well comprises receiving, by an input device, an input, verifying an authorization to use a filter assembly in response to receiving the input, opening an actuator valve in response to the verifying, actuating a pump in fluid communication with the actuator valve in response to the verifying, receiving a fluid within a filter assembly in response to opening the actuator valve and actuating the pump, wherein the fluid comprises suspended solids, and separating at least a portion of the suspended solids in the fluid within the filter assembly. The input may comprise a user identification. The pump may be disposed downstream of the filter assembly, and receiving fluid within the filter assembly may comprise drawing fluid into the filter assembly in response to actuating the pump. The method may also include storing the input and identifying information in a memory. The identifying information may comprise at least one of: a time, a volume of fluid, or a source identification of the fluid. Receiving the fluid within the filter assembly may comprise coupling a fluid conduit to a vessel, and drawing the fluid into the filter assembly from the vessel through the fluid conduit. The method may also include passing the fluid through a pre-filter prior to receiving the fluid within the filter assembly, and removing at least a portion of the suspended solids from the fluid in the pre-filter. Separating at least the portion of the suspended solids in the fluid may produce a filtered fluid, The method may also include separating a hydrocarbon from the filtered fluid to provide a hydrocarbon fluid and an aqueous fluid, storing the hydrocarbon in a hydrocarbon storage tank, and storing the aqueous fluid in a water storage tank. The method may also include injecting the aqueous fluid into an injection well. The method may also include venting a gas from the filter assembly in response to opening the actuator valve and actuating the pump. The method may also include transferring the portion of the suspended solids in the fluid to a solids collection vessel. The method may also include capturing a portion of the fluid on a pad, and transferring the portion of the fluid captured on the pad to the solids collection vessel. The solids collection vessel may comprise a sump. The method may also include separating a second fluid from the solids in the solids collection vessel, passing the second fluid to the filter assembly, and separating at least a portion of the suspended solids in the fluid within the filter assembly. The method may also include separating a second fluid from the solids in the solids collection vessel, opening a second actuator valve, actuating a second pump in fluid communication with the second actuator valve, passing the second fluid to a second filter assembly, and separating at least a portion of any suspended solids in the second fluid within the second filter assembly. The method may also include performing a cleaning cycle. Performing the cleaning cycle may comprise: closing the actuator valve, opening a drain actuator valve disposed in a drain line, spraying a cleaning fluid within the filter assembly, removing the portion of the suspended solids from the filter assembly, and passing the cleaning fluid and the portion of the suspended solids out of the filter assembly. The method may also include detecting a pressure differential across a filtration device within the filter assembly, and performing the cleaning cycle occurs in response to the pressure differential exceeding a threshold. The filter assembly may comprise a plurality of filter sections arranged in series, and each filter section of the plurality of filter sections can comprise a filtration device. The filtration device in each subsequent section through which the fluid passes may comprise a finer filter size configured to filter smaller suspended solid particles. Separating at least the portion of the suspended solids may comprise: passing the fluid through each of the filter sections in series, and filtering suspended solids in each filter section. The method may also include passing the suspended solids separated in each filter section to a sump. The filter assembly may comprise a plurality of filtration devices disposed in a housing, and each of the plurality of filtration devices can be arranged in series. Separating at least the portion of the suspended solids may comprise: passing the fluid through each of the filtration devices in series, and filtering suspended solids in each filtration device. The method may also include passing the suspended solids separated in by each filtration device to a solids collection vessel. The method may also include receiving a mobile unit comprising the input device, the actuator valve, the pump, and the filter assembly at an injection well site. The method may also include coupling the mobile unit to the injection well; and injecting the fluid into the injection well after separating at least the portion of the suspended solids in the fluid within the filter assembly.

A fluid injection system comprises a filter assembly configured to receive a fluid comprising suspended solids and separate at least a portion of the suspended solids from the fluid, an actuator valve coupled to an outlet of the filter assembly, a pump coupled to the outlet of the filter assembly, an input device, a controller comprising a memory and a processor, and a control program stored in the memory. The control program, when executed on the processor, configures to the processor to: receive an input from the input device, verify an authorization of a user to use the system based on the input, authenticate the user based on the verification, open the actuator valve to allow fluid flow through the filter assembly based on the authentication, and actuate the pump to draw fluid into the filter assembly based on the authentication. The actuator valve is configured to selectively control fluid flow into and/or out of the filter assembly, and the pump is configured to draw fluid into the filter assembly. The system may also include a substantially sealed pad configured to receive a vehicle. The vehicle may comprise a vessel containing the fluid, and the filter assembly can be configured to receive the fluid from the vessel. The system may also include a separator disposed downstream of the pump, and the separator can be configured to separate a hydrocarbon fluid from the fluid passing through the filter assembly. The system may also include at least one storage tank disposed downstream of the pump, and the pump can be configured to pass the fluid to the at least one storage tank. The system may also include a fluid injection well in fluid communication with the at least one storage tank, and a high pressure pump. The high pressure pump can be configured to pass the fluid from the at least one storage tank to the fluid injection well. The system may also include a solids collection vessel that can be configured to receive the portion of the suspended solids separated from the fluid. The system may also include a second filter assembly configured to receive a second fluid from the solids collection vessel and separate at least a portion of any suspended solids from the second fluid, a second actuator valve coupled to an outlet of the second filter assembly, and a second pump coupled to the outlet of the second filter assembly. The second pump can be configured to draw the second fluid into the second filter assembly, and the second actuator valve can be configured to selectively control fluid flow into and/or out of the second filter assembly. The system may also include a second actuator valve disposed in a fluid communication line between the filter assembly and the solids collection vessel. The second actuator valve can be configured to selectively control fluid flow into and/or out of the filter assembly to the solids collection vessel. The control program may further configure the processor to: close the actuator valve, and actuate the second actuator valve to allow fluid flow from the filter assembly to the solids collection vessel. The system may also include a pre-filter, wherein the pre-filter is configured to separate particles above a predetermined size from the fluid prior to the fluid passing to the filter assembly. The system may also include one or more nozzles disposed within the filter assembly, and the nozzles can be configured to wash a filtration device within the filter assembly. The system may also include a vent disposed in the filter assembly, and the vent can comprise a one-way valve configured to release gas from within the filter assembly to an exterior of the filter assembly. The system may also include a solids collection vessel. The vent can be in fluid communication with the solids collection vessel and may be configured to pass the vented gas to the solids collection vessel. The system may also include a plurality of pressure sensors disposed within the filter assembly, where the pressure sensors can be configured to detect a pressure differential across a filtration device within the filter assembly. The control program can further configure the processor to perform a cleaning cycle in response to the pressure differential exceeding a threshold. The filter assembly, the actuator valve, the pump, the input device, and the controller can be disposed within a portable unit. The filter assembly may comprise a housing defining a chamber, a filtration device disposed within the chamber, where the filtration device divides the chamber into an inlet portion and an outlet portion, and wherein the filtration device comprises a metallic screen material, a fluid inlet disposed in the housing and configured to receive a fluid comprising suspended solids into the inlet portion, a fluid outlet disposed in the housing and configured to pass the fluid out of the housing from the outlet portion, and a drain disposed in a lower portion of the housing and configured to pass a portion of the fluid comprising at least a portion of the suspended solids out of the inlet portion of the housing.

A filter system for filtering produced water from a wellbore comprises a housing defining a chamber, a filtration device disposed within the chamber, where the filtration device divides the chamber into an inlet portion and an outlet portion, and wherein the filtration device comprises a metallic screen material, a fluid inlet disposed in the housing and configured to receive a fluid comprising suspended solids into the inlet portion, a fluid outlet disposed in the housing and configured to pass the fluid out of the housing from the outlet portion, and a drain disposed in a lower portion of the housing and configured to pass a portion of the fluid comprising at least a portion of the suspended solids out of the inlet portion of the housing. The filtration device can be configured to separate the portion of the solids having a size larger than an amount ranging from about 1,000 microns to about 5 microns. The filter system may also include a catch basin formed in the bottom of the housing, and the drain can be disposed in the catch basin. The filter system may also include a strainer basket disposed in the catch basin. The filter system may also include an actuator valve that is configured to selectively provide fluid communication through the fluid outlet. The filter system may also include a pump in fluid communication with the fluid outlet, and the pump can be configured to draw fluid from the housing. The filter system may also include a fluid injection well in fluid communication with the fluid outlet. The filter system may also include a solids collection vessel coupled to the drain. The filter system may also include a second housing comprising a filter basket. The second housing can be in fluid communication with the fluid inlet, and the fluid inlet and the second housing can be configured to pass a fluid through the second housing and filter basket before passing the fluid to the housing. The filter system may also include one or more nozzles disposed within the housing, the nozzles can be configured to spray a fluid on the filtration device within the housing. The filter system may also include a vent disposed in an upper portion of the housing, and the vent may comprise a one-way valve configured to release gas from within the housing to an exterior of the housing. The filter system may also include a solids collection vessel, and the vent can be configured to discharge the gas to the solids collection vessel. The filtration device may comprise a flat screen, and/or the filtration device may comprise a corrugated screen. The housing can have a rectangular cross-section, and the filtration device can comprise a planar screen. The housing can have a circular cross-section, and the filtration device can comprise a planar screen. The housing can have a circular cross-section, and the filtration device can comprises a cylindrical screen. The filter system may also include a second housing defining a second chamber, a second filtration device disposed within the second chamber, a second fluid inlet disposed in the second housing and coupled to the fluid outlet, a second fluid outlet disposed in the second housing and configured to pass a fluid out of the second housing from the second outlet portion, and a second drain disposed in a lower portion of the housing and configured to pass a fluid comprising at least a portion of the suspended solids out of the inlet portion of the housing. The second filtration device divides the chamber into a second inlet portion and a second outlet portion, and the second filtration device is configured to filter a smaller particle size than the filtration device in the housing. The filter system may also include a second filtration device disposed within the chamber, and the filtration device and the second filtration device can be disposed in series within the chamber. The filtration device and the second filtration device can divide the chamber into the inlet portion, a second portion, and the outlet portion. The filter system may also include a second drain disposed in the lower portion of the housing and configured to pass a second portion of the fluid comprising at least a second portion of the suspended solids out of the second portion of the housing. The pore size of the second filtration device may be smaller than the pore size of the filtration device. The filter system may also include a transportation device, and the housing can be mounted on the transportation device.

A method of providing a portable filtration device comprises transporting a portable filtration device to a first location on a transportation device, passing a fluid comprising suspended solids through the fluid inlet, passing the fluid through the filtration device within the housing, separating at least a portion of the suspended solids from the fluid using the filtration device to produce a filtered fluid, passing the filtered fluid out of the housing through the fluid outlet, passing at least a portion of the separated suspended solids through the drain, and receiving the portion of the separated suspended solids within the solids collection vessel. The portable filtration device comprises a housing, a filtration device disposed within the housing, a fluid inlet, a fluid outlet, a drain, and a solids collection vessel in fluid communication with the drain. Separating at least the portion of the suspended solids from the fluid may comprise separating the suspended solids comprising a particle size larger than about 75 microns. The method can also include opening an actuator valve in fluid communication with the housing, and passing the fluid comprising the suspended solids into the housing can occur in response to opening the actuator valve. The method can also include actuating a pump in fluid communication with the housing, and passing the fluid comprising the suspended solids into the housing can occur in response to actuating the pump. The method can also include injecting the filtered fluid into an injection wellbore.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system for filtering produced fluid from a wellbore, the system comprising:
- a filter system comprising:
  - a housing defining a chamber;
  - a filtration device disposed within the chamber, wherein the filtration device divides the chamber into an inlet portion and an outlet portion;
  - a fluid inlet disposed in the housing and configured to receive a fluid comprising suspended solids into the inlet portion;
  - a fluid outlet disposed in the housing and configured to pass the fluid out of the housing from the outlet portion; and
  - a drain line in fluid communication with a lower portion of the housing and configured to pass at least a portion of the suspended solids out of the inlet portion of the housing;
- a solids collection vessel fluidly coupled with the drain line, wherein the solids collection vessel is configured to receive at least the portion of the suspended solids passed through the drain line; and
- a fluid line coupled to the solids collection vessel, wherein the solids collection vessel is configured to separate a second fluid from the portion of the suspended solids received in the solids collection vessel and pass the second fluid to the filter system through the fluid line, and wherein the fluid line coupled to the solids collection vessel is in fluid communication with the inlet portion of the chamber.

2. The system of claim 1, wherein the fluid line is configured to pass the second fluid through the fluid inlet.

3. The system of claim 1, wherein the solids collection vessel comprises at least one of a weir or a screen element, and wherein the at least one of the weir or the screen element is configured to separate the second fluid from the portion of the suspended solids.

4. The system of claim 3, wherein the solids collection vessel further comprises a valve system configured to automatically drain the second fluid from the solids collection vessel when a level of the second fluid rises above a threshold level.

5. The system of claim 1, further comprising: an actuator valve, wherein the actuator valve is configured to selectively provide fluid communication through the fluid inlet.

6. The system of claim 1, further comprising: a pump in fluid communication with the fluid outlet, wherein the pump is configured to draw fluid from the housing.

7. The system of claim 1, further comprising: a second housing comprising a filter basket, wherein the second housing is in fluid communication with the fluid inlet, and wherein the fluid inlet and the second housing are configured to pass a fluid through the second housing and filter basket before passing the fluid to the housing.

8. The system of claim 1, further comprising: a vent disposed in an upper portion of the housing, wherein the vent comprises a valve configured to release gas from within the housing to an exterior of the housing.

9. The system of claim 1, further comprising: a valve disposed in the housing, wherein the valve is configured to allow gas to enter the housing to prevent the housing from collapsing.

10. The system of claim 1, wherein the filtration device comprises at least one of a flat screen or a corrugated screen.

11. The system of claim 1, wherein the filter system further comprises a second filtration device disposed within the chamber.

12. The system of claim 1, further comprising:
- a second housing defining a second chamber;
- a second filtration device disposed within the second chamber, wherein the second filtration device divides the second chamber into a second inlet portion and a second outlet portion, and wherein the second filtration device is configured to filter a smaller particle size than the filtration device in the housing;
- a second fluid inlet disposed in the second housing and coupled to the fluid outlet;
- a second fluid outlet disposed in the second housing and configured to pass a fluid out of the second housing from the second outlet portion; and
- a second drain line disposed in a lower portion of the second housing and configured to pass a fluid comprising at least a second portion of the suspended solids out of the second inlet portion of the second housing, wherein the second drain line is in fluid communication with the solids collection vessel.

13. A system for filtering produced fluid from a wellbore, the system comprising:
- a filter system comprising:
  - a housing defining a chamber;
  - a filtration device disposed within the chamber, wherein the filtration device divides the chamber into an inlet portion and an outlet portion;
  - a fluid inlet disposed in the housing and configured to receive a fluid comprising suspended solids into the inlet portion;
  - a fluid outlet disposed in the housing and configured to pass the fluid out of the housing from the outlet portion; and
  - a drain in fluid communication with a lower portion of the housing and configured to pass at least a portion of the suspended solids out of the inlet portion of the housing;
- a solids collection vessel in fluid communication with the drain, wherein the solids collection vessel is configured to receive at least the portion of the suspended solids passed through the drain;
- a fluid line coupled to the solids collection vessel, wherein the solids collection vessel is configured to separate a second fluid from the portion of the suspended solids received in the solids collection vessel and pass the fluid to at least one of the filter system or a second filter system; and
- a pump in fluid communication with the fluid outlet and disposed downstream of the fluid outlet, wherein the pump is configured to draw fluid from the housing.

* * * * *